(12) United States Patent
Masuda et al.

(10) Patent No.: US 8,899,711 B2
(45) Date of Patent: Dec. 2, 2014

(54) INKJET RECORDING METHOD, INKJET RECORDING DEVICE, AND RECORDED MATERIAL

(71) Applicants: Kiminori Masuda, Tokyo (JP); Mariko Kojima, Tokyo (JP); Akiko Bannai, Kanagawa (JP); Takashi Tamai, Kanagawa (JP); Tomohiko Kohda, Kanagawa (JP); Naoko Kitaoka, Kanagawa (JP)

(72) Inventors: Kiminori Masuda, Tokyo (JP); Mariko Kojima, Tokyo (JP); Akiko Bannai, Kanagawa (JP); Takashi Tamai, Kanagawa (JP); Tomohiko Kohda, Kanagawa (JP); Naoko Kitaoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/187,665

(22) Filed: Feb. 24, 2014

(65) Prior Publication Data

US 2014/0253618 A1  Sep. 11, 2014

(30) Foreign Application Priority Data

Mar. 6, 2013 (JP) ................................. 2013-043864
Mar. 6, 2013 (JP) ................................. 2013-043942
Oct. 31, 2013 (JP) ................................. 2013-227475

(51) Int. Cl.
*B41J 29/38* (2006.01)
*B41J 2/045* (2006.01)

(52) U.S. Cl.
CPC .................................. *B41J 2/04541* (2013.01)
USPC .................... 347/10; 347/9; 347/95; 347/100

(58) Field of Classification Search
USPC ............. 347/5, 6, 9, 10, 14, 19, 7, 68, 70, 71, 347/20, 21, 95, 100
See application file for complete search history.

(56) References Cited

U.S. PATENT DOCUMENTS

| 4,492,968 | A | * | 1/1985 | Lee et al. ......................... 347/10 |
| 5,514,208 | A | | 5/1996 | Nagai et al. |
| 5,622,550 | A | | 4/1997 | Konishi et al. |
| 5,810,915 | A | | 9/1998 | Nagai et al. |
| 5,879,439 | A | | 3/1999 | Nagai et al. |
| 5,882,390 | A | | 3/1999 | Nagai et al. |
| 5,972,082 | A | | 10/1999 | Koyano et al. |
| 5,993,524 | A | | 11/1999 | Nagai et al. |
| 6,120,589 | A | | 9/2000 | Bannai et al. |
| 6,231,652 | B1 | | 5/2001 | Koyano et al. |

(Continued)

FOREIGN PATENT DOCUMENTS

| JP | 9-076534 | 3/1997 |
| JP | 2001-260350 | 9/2001 |

(Continued)

*Primary Examiner* — Juanita D Jackson
(74) *Attorney, Agent, or Firm* — Cooper & Dunham LLP

(57) ABSTRACT

An inkjet recording method is performed using an inkjet recording device including a recording head provided with a nozzle, a pressure chamber, a pressure generator and a driving signal generator, the method satisfying the following requirements (1) and (2): (1) it is required to use aqueous ink having a dynamic surface tension larger by 10 mN/m or more than a static surface tension when the surface life measured at 25° C. by a maximum foaming pressure method is 15 ms and a dynamic surface tension larger by 5 mN/m or more than a static surface tension when the surface life measured by a maximum foaming pressure method is 1500 ms and (2) it is required that the signals have a drawing pulse in one print period and a meniscus of the aqueous ink is drawn into the nozzle in two stages by the drawing pulse.

10 Claims, 13 Drawing Sheets

(56) References Cited

U.S. PATENT DOCUMENTS

| | | |
|---|---|---|
| 6,261,349 B1 | 7/2001 | Nagai et al. |
| 6,613,136 B1 | 9/2003 | Arita et al. |
| 6,695,443 B2 * | 2/2004 | Arita et al. .................. 347/100 |
| 2002/0083866 A1 | 7/2002 | Arita et al. |
| 2002/0096085 A1 | 7/2002 | Gotoh et al. |
| 2003/0064206 A1 | 4/2003 | Koyano et al. |
| 2003/0076394 A1 | 4/2003 | Gotoh et al. |
| 2003/0107632 A1 | 6/2003 | Arita et al. |
| 2005/0007431 A1 | 1/2005 | Koyano et al. |
| 2005/0117008 A1 | 6/2005 | Konishi |
| 2005/0168552 A1 | 8/2005 | Arita et al. |
| 2005/0231575 A1 | 10/2005 | Bannai et al. |
| 2006/0176349 A1 | 8/2006 | Nagai et al. |
| 2007/0221078 A1 | 9/2007 | Namba et al. |
| 2008/0138519 A1 | 6/2008 | Habashi et al. |
| 2008/0248260 A1 | 10/2008 | Kojima et al. |
| 2008/0254228 A1 | 10/2008 | Kojima et al. |
| 2008/0302268 A1 | 12/2008 | Arita et al. |
| 2009/0239044 A1 | 9/2009 | Habashi et al. |
| 2009/0258196 A1 | 10/2009 | Nagashima et al. |
| 2009/0263632 A1 | 10/2009 | Kojima et al. |
| 2010/0020142 A1 | 1/2010 | Bannai et al. |
| 2010/0112219 A1 | 5/2010 | Yokohama et al. |
| 2010/0271435 A1 | 10/2010 | Kojima et al. |
| 2011/0063351 A1 | 3/2011 | Kitaoka |
| 2011/0169889 A1 | 7/2011 | Kojima et al. |
| 2011/0205288 A1 | 8/2011 | Matsuyama et al. |
| 2011/0216123 A1 | 9/2011 | Tamai et al. |
| 2011/0300353 A1 | 12/2011 | Habashi et al. |
| 2011/0310166 A1 | 12/2011 | Namba et al. |
| 2011/0316947 A1 | 12/2011 | Kojima et al. |
| 2012/0121831 A1 | 5/2012 | Kudoh et al. |
| 2012/0133703 A1 | 5/2012 | Kojima |
| 2012/0236066 A1 | 9/2012 | Tamai et al. |
| 2012/0328853 A1 | 12/2012 | Matsuyama et al. |
| 2013/0194345 A1 | 8/2013 | Tamai et al. |
| 2013/0242009 A1 | 9/2013 | Bannai et al. |
| 2013/0307912 A1 | 11/2013 | Masuda et al. |

FOREIGN PATENT DOCUMENTS

| | | |
|---|---|---|
| JP | 2004-009548 | 1/2004 |
| JP | 2007-144659 | 6/2007 |
| JP | 2007-269021 | 10/2007 |
| JP | 2008-001003 | 1/2008 |
| JP | 2008-239964 | 10/2008 |
| JP | 2010-047686 | 3/2010 |
| JP | 2011-062821 | 3/2011 |

* cited by examiner

NOZZLE WATER-REPELLENT FILM DETERIORATED BY MAINTENANCE

DETERIORATED WATER-REPELLENT FILM

MENISCUS OVERFLOW AFTER DROPLET IS DISCHARGED IN HIGH-FREQUENCY DRIVE (REFILL)

DETERIORATED WATER-REPELLENT FILM

FIG. 5
DISCHARGE WITHOUT MENISCUS PULLING PULSE BEFORE DISCHARGE
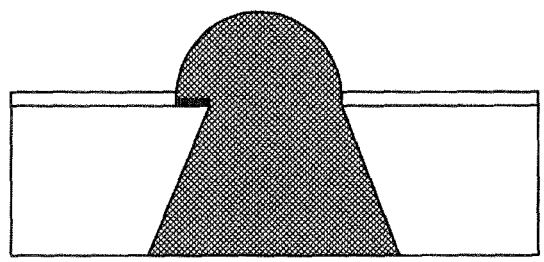 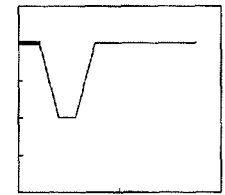
DISCHARGE PULSE WITHOUT MENISCUS PULLING PULSE BEFORE DISCHARGE
OVERFLOW MENISCUS IS PULLED, BUT PARTIALLY REMAINED
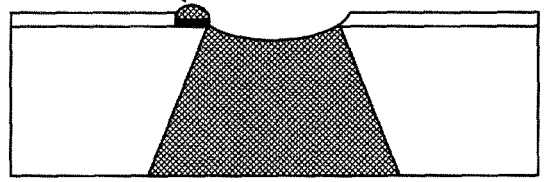 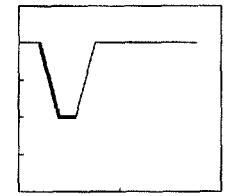
DISCHARGE PULSE WITHOUT MENISCUS PULLING PULSE BEFORE DISCHARGE
DROPLET CURVES DUE TO REMAINING INK
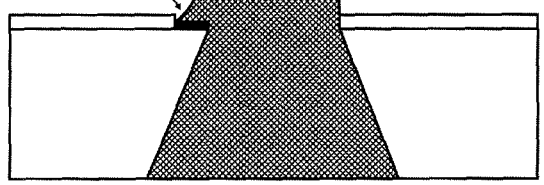 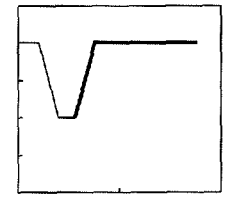
DISCHARGE PULSE WITHOUT MENISCUS PULLING PULSE BEFORE DISCHARGE

INKJET RECORDING METHOD, INKJET RECORDING DEVICE, AND RECORDED MATERIAL

CROSS-REFERENCE TO RELATED APPLICATIONS

This patent application is based on and claims priority pursuant to 35 U.S.C. §119 to Japanese Patent Application Nos. 2013-043864, 2013-227475 and 2013-043942, filed on Mar. 6, 2013. Oct. 31, 2013 and Mar. 6, 2013, respectively in the Japan Patent Office, the entire disclosure of which is hereby incorporated by reference herein.

BACKGROUND

1. Field of the Invention

The present invention relates to an inkjet recording method, an inkjet recording device, and a recorded material.

2. Description of the Related Art

An inkjet recording system is a system in which ink droplets are jetted from very fine nozzles such that they are adsorbed to a recording member to thereby form characters and images on the recording member. This system has been widely used in recent years because images are formed in full color more easily in this inkjet recording system than in other recording systems and high resolution images are obtained using a device having a simple structure in this system.

Various characteristics are required for the ink used in this inkjet recording system. Particularly, jetting stability when the ink is jetted from the head is important because it affects image quality.

The characteristics of the ink are indicated by material properties such as viscosity and surface tension. The image qualities and wettability of the ink can be controlled by controlling these material properties.

When an ink droplet is ejected, a new ink meniscus is formed at the discharge port simultaneously when the ink droplet is ejected. In this case, the surface tension of the ink is different in different stages, for example, when the meniscus starts forming at the discharge port, just before the ink is ejected, at the moment the ink is ejected, when the ink is flying, at the moment the ink is landed onto a recording member, and when the ink penetrates into a recording member. Particularly, the surface tension of the ink under the condition (when a new meniscus plane starts forming and when the ink penetrates into a recording member such as paper) regarded as a static condition depressed in moving is largely different from that of the ink under the condition (the moment the ink is ejected) regarded as a dynamic condition accelerated in moving. For this, it is necessary to consider not only the static surface tension but also dynamic surface tension when evaluating the characteristics of inkjet recording ink.

Generally, the static surface tension affects the penetrability of ink into a recording member and is therefore preferably lower, whereas the dynamic surface tension affects discharge stability and is therefore preferably higher. It has been already known that these surface tensions can be controlled by the ratios of, for example, a surfactant and humectant to be added in ink.

JP-2011-062821-A discloses a method of forming a waveform to form droplets having different sizes from one driving waveform for the purposes of preventing the occurrence of droplet bending of the droplets even under the condition in which the nozzles are degraded and also, more shortening the length of a waveform than that of a conventional one in a droplet ejecting device which generates liquid droplets having a plurality of different sizes from one waveform structure. JP-2011-062821-A also discloses a waveform structure differentiating the shape of a discharge pulse generated from a driving pulse duplicatively used corresponding to the size of the droplet. This invention is similar to the present invention in the point that it has a waveform element which expands the pressure liquid chamber in at least two stages to draw a meniscus in the pressure chamber. However, no study is made concerning the properties of ink, posing the problem that discharge stability cannot be secured by the properties of ink.

Also, JP-2008-239964-A discloses an inkjet recording ink set and recording method in which the relation between the surface tensions of a black ink and other color inks is defined to suppress white haze and bleeding at the boundary between different colors when the black ink and color inks which are different in penetrability are used.

However, there is no evidence of studies concerning the influences of both dynamic surface tension and static surface tension and also, nothing refers to discharge stability. Therefore, the problem concerning the securing of discharge stability is unsolved.

SUMMARY

When ink jet recording ink (hereinafter also simply referred to as "ink") which is reduced in static surface tension and increased in dynamic surface tension is ejected from the head, this gives rise to problems concerning appearances of nozzle stream bending and streaks in the printed material, resulting in degraded image qualities.

In view of this situation, it is an object of the present invention to provide an inkjet recording method in which aqueous ink can be ejected stably even if there is a large difference between the dynamic surface tension and static surface tension of the aqueous ink and also, a good image can be obtained.

The above problems can be solved by the following invention 1).

1) An inkjet recording method performed using an inkjet recording device including a recording head provided with a nozzle ejecting liquid droplets of aqueous ink, a pressure chamber communicated with the nozzle, and a pressure generator that pressurizes the pressure chamber, and a driving signal generator that generates signals applied to the pressure generator, the method including ejecting the aqueous ink droplets by the pressure generated by the pressure generator according to the signals and satisfying the following requirements (1) and (2):

(1) it is required to use aqueous ink having a dynamic surface tension larger by 10 mN/m or more than a static surface tension when the surface life measured at 25° C. by a maximum foaming pressure method is 15 ms and a dynamic surface tension larger by 5 mN/m or more than a static surface tension when the surface life measured by a maximum foaming pressure method is 1500 ms; and (2) it is required that the signals have a drawing pulse in one print period and the aqueous ink forming a meniscus in the nozzle is drawn into the nozzle in two stages by the drawing pulse.

According to the present invention, an ink jet recording method can be provided, in which the aqueous ink can be stably ejected and also, a good image can be obtained even if there is a large difference between the dynamic surface tension and static surface tension of the aqueous ink.

BRIEF DESCRIPTION OF THE DRAWINGS

FIG. 5 is a schematic view showing the condition in a conventional system in which droplet bending is caused by ejecting liquid droplets in the condition where meniscus overflow arises;

DETAILED DESCRIPTION

Figure 1:
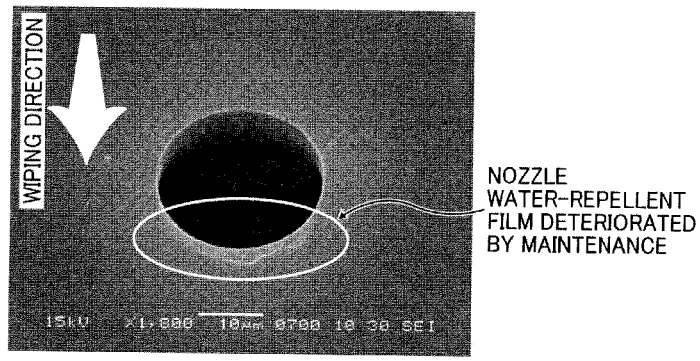
FIG. 1 is a view showing a SEM image of a nozzle put in the situation where a nozzle water-repellent film is degraded.

The invention 1) will be explained in detail. Because embodiments of the present invention include the following 2) to (10), these embodiments will be also explained together. It is to be noted that though there is the case where parts where inks having different colors contact with each other are blurred when a color image is formed using an ink set constituted of inks having a plurality of colors, the following 2), 3), and 7) further solve this problem.

2) The inkjet recording method according to the above 1), wherein the drawing pulse in the signals in the one print period exists preceding the discharge pulse for ejecting aqueous ink.

3) The inkjet recording method according to the above 1) or 2), the method further satisfying the following requirements (3) and (4):

(3) it is required to use an ink set including aqueous inks having two or more colors including black; and (4) it is required that the static surface tension of the black ink at 25° C. is higher by 0 to 4 mN/m than those of all other color inks;

4) The inkjet recording method according to the above 3), wherein the viscosity of each ink of the ink set at 25° C. is 3 to 20 mPa·s.

5) The inkjet recording method according to any one of the above 1) to 4), wherein the surface of the nozzle is treated to provide water repellency.

6) The inkjet recording method according to any one of the above 1) to 5), wherein the ink contains water, a water-soluble organic solvent, a colorant, and a surfactant.

7) An ink jet recording device comprising a recording head provided with a nozzle ejecting liquid droplets of aqueous ink, a pressure chamber communicated with the nozzle, and a pressure generator that pressurizes the pressure chamber, and a driving signal generator that generates signals applied to the pressure generator, to eject the aqueous ink droplets by the pressure generated by the pressure generator according to the signals, and the device satisfying the following requirements (1) and (2):

(1) it is required that the device is provided with a container that stores aqueous ink having a dynamic surface tension larger by 10 mN/m or more than a static surface tension when the surface life measured at 25° C. by a maximum foaming pressure method is 15 ms and a dynamic surface tension larger by 5 mN/m or more than a static surface tension when the surface life measured at 25° C. by a maximum foaming pressure method is 1500 ms; and (2) it is required that the signals have a drawing pulse drawing a meniscus of the aqueous ink into the nozzle in two stages in one print period.

8) The inkjet recording device according to the above 7), wherein the drawing pulse in the signals in the one print period exists preceding the discharge pulse for ejecting aqueous ink.

9) The inkjet recording device according to the above 7) or 8), the method further satisfying the following requirements (3) and (4):

(3) it is required to use an ink set including aqueous inks having two or more colors including black; and (4) it is required that the static surface tension of the black ink at 25° C. is higher by 0 to 4 mN/m than those of all other color inks;

10) A recorded material comprising an image formed by the ink jet recording method according to any one of the above 1) to 6) on a recording medium.

<Securing of Discharge Stability>

Figure 2:
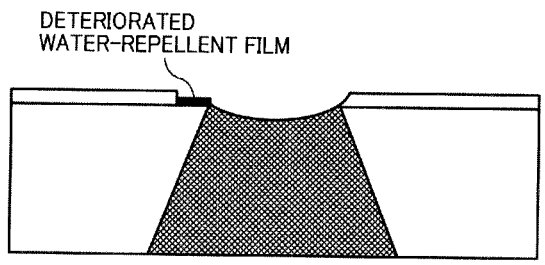
FIG. 2 is a schematic view showing the state of a meniscus in a usual case (static condition)

FIG. 1 shows a SEM image of a nozzle. A nozzle water-repellent film on the surface of a nozzle plate on the side opposite to a liquid chamber is degraded a little by little by a physical load in maintenances. A meniscus is usually formed in a nozzle of the head filled with ink. In usual case (static state), the meniscus forms a bridge toward the liquid chamber side with respect to a nozzle edge and the jetting nozzle is in the condition less affected by the degradation of the nozzle water-repellent film (see FIG. 2).

Figure 3:
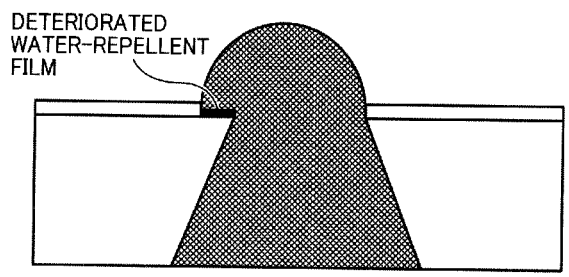
FIG. 3 is a schematic view showing meniscus overflow after liquid droplets are ejected or just after high-frequency driving.
Figure 4:
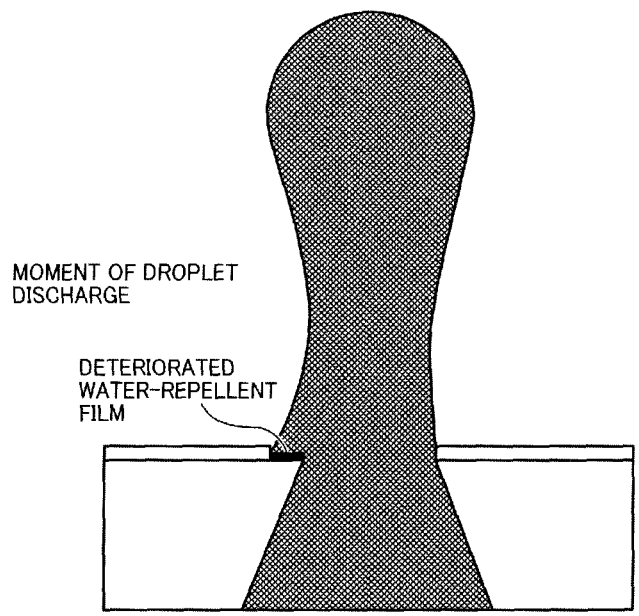
FIG. 4 is a schematic view showing meniscus overflow after liquid droplets are ejected or just after high-frequency driving (moment the liquid droplets are ejected)

However, the meniscus forms an asymmetrical shape due to the deteriorated nozzle water-repellent film when, as shown in FIGS. 3 and 4, phenomena occur that ink is likely convexed toward the outside of the nozzle, as shown by, for example, meniscus overflow which occurs after a liquid droplet is ejected (phenomenon that when a liquid droplet is ejected, the inflow of the ink from a common liquid chamber along with the flow of ink out of the nozzle is not instantly stopped but increased by its excess momentum, causing meniscus overflow of the nozzle. Particularly, the meniscus overflow is increased with increase in waveforms (those giving a large discharge amount per unit time) to eject a liquid droplet having a large size in one print period) and meniscus overflow which occurs just after high-frequency driving (phenomenon that the inflow of ink from a common liquid chamber along with high-frequency driving causing the flow of a large amount of ink out of nozzle is not instantly stopped but increased by its excess momentum, causing meniscus overflow of the nozzle. This is a phenomenon having a refill period Rf different from the natural oscillation period Tc of the liquid chamber). Then, if liquid droplets are ejected when meniscuses are in the asymmetrical state, this causes droplet bending.

The term "one print period" means a time interval during which each actuator forms each dot on a medium, and in the present invention, this term means a time interval required to supply a discharge pulse to form each dot and a pulse to draw meniscuses in at least two stages preceding the discharge pulse.

Figure 10:
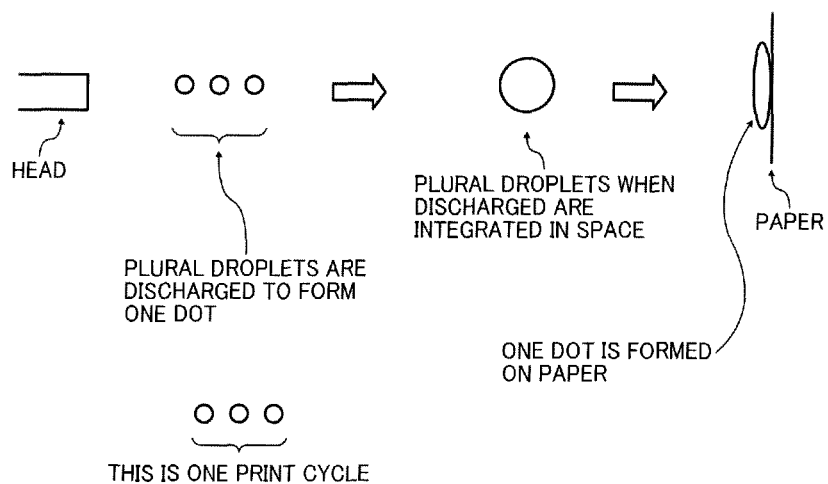
FIG. 10 is an explanatory view of one print period.

The above one print period will be further explained with reference to FIG. 10. FIG. 10 is a view in which a drawing pulse is omitted and only a discharge pulse is illustrated, showing an example in which three droplets are ejected to form one dot. However, the number of droplets is changed to, for example, three when a large droplet is formed or two when an intermediate droplet is formed. Also, though FIG. 10 shows a system in which liquid droplets in one print period are united in the air and then adsorbed to a recording medium, a system in which liquid droplets in one print period are sequentially adsorbed in the order of ejection to a recording medium may be used. The system in which liquid droplets are united in the air is desirable because the shape of ink is close to a circle and when ink is landed on a recording medium, the landed position is not deviated from a right position.

As shown in FIG. 5, because the pullback of the overflowed ink is insufficient in the case of ejecting in the condition where meniscus overflow occurs as mentioned above, ink overflow remains in the condition just before droplets are jetted, causing droplet bending.

Figure 6:
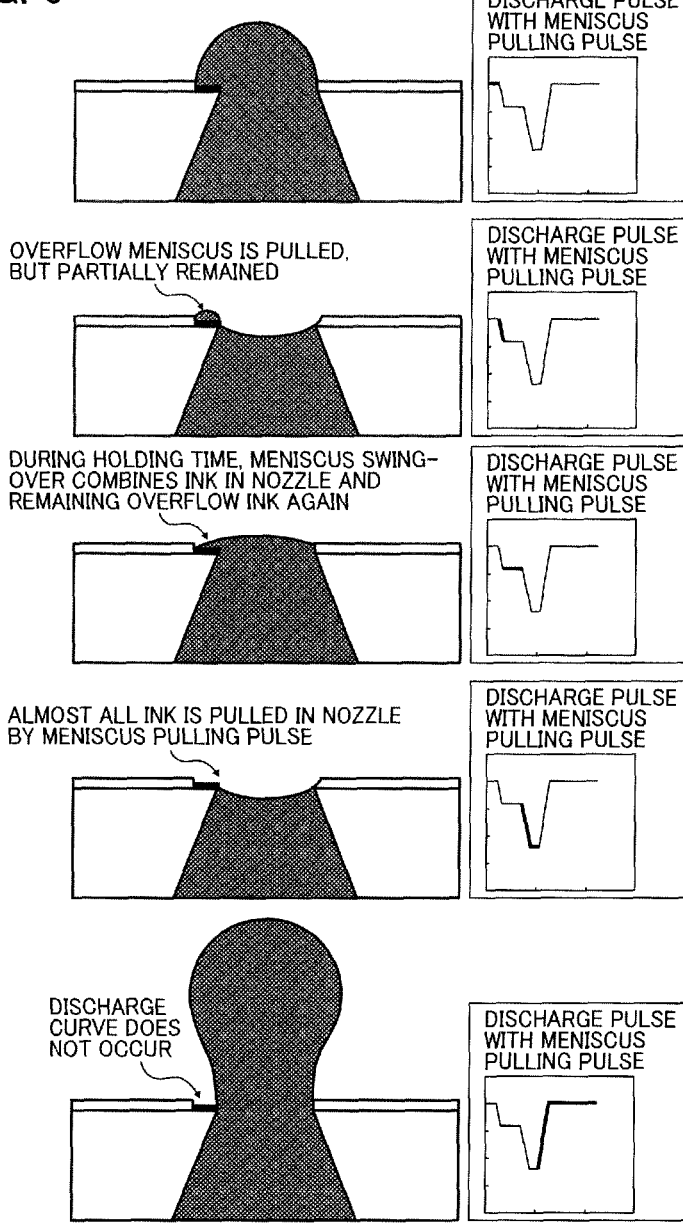
FIG. 6 is a schematic view showing the condition where droplet bending is avoided by adding a meniscus drawing pulse just before applying a discharge pulse.

On the other hand, when, as shown in FIG. 6, a meniscus drawing pulse is added just before a discharge pulse is supplied, the overflowed ink is drawn into the nozzle before the droplet ejection starts and therefore, the droplet bending can be avoided. In this case, the time at which the above meniscus drawing pulse is added is preferably just before the discharge pulse is supplied as shown in FIG. 6 though no particular limitation is imposed on the time as long as it is before the discharge pulse is supplied and it is the time at which the meniscus can be drawn.

Also, when a conventional discharge pulse is used, the influence of the surface tension of ink on ejection is small when the difference between the dynamic surface tension and static surface tension of the ink is small, because the difference in surface tension between ink remaining on the surface of the nozzle and the next ejecting ink droplet is small. However, when the difference between the dynamic surface tension and static surface tension of ink is large, the surface tension of ink remaining on the surface of the nozzle starts to largely decrease just after the ink stands still on the surface of the nozzle. This causes a difference in surface tension between the remaining ink and the next ink droplet. Then, when the remaining ink is united with the ejecting ink droplet, the united droplet has non-uniform surface tension, so that the surface of the liquid droplet is deformed, leading to droplet bending.

However, when a meniscus drawing operation is performed in at least two stages at the time earlier than the ejection time (preferably, just before the ejection), the remaining ink is drawn into the nozzle before the ejection of the liquid droplet is started and therefore, the droplet bending can be avoided. Also, even in the case where ink remains on the surface as it is, the surface tension of the remaining ink is returned to a high value so that the difference in surface tension between the remaining ink and the next ink droplet is small because the remaining ink is once united with the ink in the nozzle. This excludes the influence on ejection and therefore, a better discharge image is obtained.

The aqueous ink according to the present invention is characterized by the feature that it has a dynamic surface tension larger by 10 mN/m or more than a static surface tension when the surface life measured at 25° C. by a maximum foaming pressure method is 15 ms and a dynamic surface tension larger by 5 mN/m or more than a static surface tension when the surface life measured at 25° C. by a maximum foaming pressure method is 1500 ms. When the dynamic surface tension of the ink is in this range, the aforementioned effect of the remaining ink is strong. It is to be noted that the dynamic surface tension means surface tension during microtime and, for example, a maximum foaming pressure method, vibrating-jet method, meniscus method, and galling-drop method are generally known as the method used to measure surface tension. In the present invention, the surface tension was measured by the maximum foaming pressure method enabling simple measurement in a short time.

Figure 7:
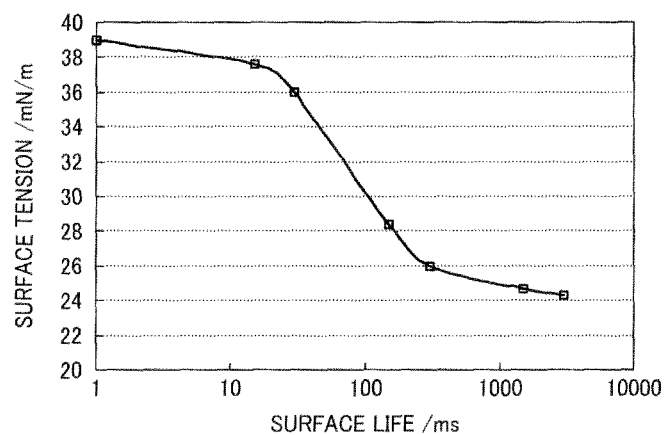
FIG. 7 is a view showing a profile of dynamic surface tension as a function of surface lifetime.

Inkjet printers have been more progressed in printing speed year by year with the development of recent high-speed printing technologies, enabling continuous printing at a print speed of tens of meters/min at present. An ink meniscus at the surface of the nozzle in an inkjet printer vibrates at a frequency of $10^4$ to $10^6$ Hz and ink droplets are successively formed at the same frequency to enable this high-speed printing. For this, when the dynamic surface tension of ink at the time of ejection is measured, it is necessary to measure surface tension during microtime of the order of microseconds. It is however difficult to simply measure this. Here, when looking at a profile of dynamic surface tension as a function of surface lifetime, it is found that the dynamic surface tension increases and decreases monotonously as a function of the surface lifetime as shown in FIG. 7. In light of this, dynamic surface tension at a surface lifetime of about 15 ms close to the limit of measurement was found to define it as an approximate value of the dynamic surface tension of the ink at the time of actual ejection in the maximum foaming pressure method in the present invention.

On the contrary, the process of penetration in a recording medium after ejection is performed in a time period of the order of millisecond or more and affects print defects such as blurring and bleeding. For this, dynamic surface tension and static surface tension at a surface lifetime of 1000 ms or more affect the quality of an image. In view of this, an attention was focused on the dynamic surface tension at a surface lifetime of about 1500 ms in the present invention.

<Limitation of Blurring>

As mentioned above, dynamic surface tension and static surface tension at a surface lifetime of 1000 ms or more affect the process of penetration in a recording medium. For this, if these values are different in each ink when inks having a plurality of colors are used to make a color image, parts where different colors contact with each other differ from each other in the condition of penetration, leading to degraded image qualities. Because, particularly, black ink is superior in visibility, the contour line of even a fine line or point is so clearly visible that the distortion of an image is visibly conspicuous. When, a dot of black ink having high penetrability, that is, a low static surface tension and a dot of color ink having low penetrability, that is, a high static surface tension are adjacent to each other, the black ink is pulled to the side of the other color ink having high static surface tension and the black ink is mixed in the other color ink side, resulting in the occurrence of a bleeding phenomenon that the contour part is indistinct. This phenomenon easily occurs on, particularly, a recording medium inferior in penetrability and also, high-speed printing which cannot take time for the penetration.

It is better to increase the static surface tension of the black ink and to decrease the static surface tension of other color inks to prevent the occurrence of the above phenomenon. However, if the difference is too large, other color inks are mixed in the black ink side, leading to degraded image qualities, for example, narrower black characters and generation of bleeding at the boundary parts. If the difference in static surface tension is small, no bleeding occurs or small bleeding occurs if some bleeding occurs, exerting small influence on image qualities because of mixing in black ink having low brightness.

In light of this, it is so designed that the static surface tension of black ink is higher by 0 to 4 mN/m than each of the static surface tensions of other color inks at 25° C.

The aqueous ink used in the present invention contains water, a colorant, a surfactant, a water-soluble organic solvent, and other components.

<Colorants>

Although as the colorants, dyes and pigments may be used, pigments are preferably used from the viewpoint of the water resistance and light fastness of a recorded material. No particular limitation is imposed on the type of pigment and examples of the pigment include the following organic pigments and inorganic pigments. These pigments may be used either singly or in combinations of two or more.

Organic pigments: azo type, phthalocyanine type, anthraquinone type, dioxazine type, indigo type, thioindigo type, perylene type, isoindolinone type, aniline black, azomethine type, rhodamine B lake pigments, and the like.

Inorganic pigments: carbon black, iron oxide, titanium oxide, calcium carbonate, barium sulfate, aluminum hydroxide, barium yellow, ultramarine, cadmium red, chrome yellow, metal powders, and the like.

Specific examples of the black pigments include carbon blacks (C. I. Pigment Black 7) such as furnace black, lamp black, acetylene black, and channel black, metals such as copper oxide, iron oxide (C. I. Pigment Black 11), and titanium oxide, and organic pigments such as aniline black (C. I. Pigment Black 1).

Specific examples of the yellow pigments include C. I. Pigment Yellow-1 (Fast Yellow-G), 2, 3, 12 (Disazo Yellow AAA), 13, 14, 16, 17, 20, 23, 24, 34, 35, 37, 42 (yellow iron oxide), 53, 55, 73, 74, 75, 81, 83 (Disazo Yellow HR), 86, 93, 95, 97, 98, 100, 101, 104, 108, 109, 110, 114, 117, 120, 125, 128, 129, 137, 138, 139, 147, 148, 150, 151, 153, 154, 155, 166, 168, 180, and 185.

Specific examples of the magenta pigments include C. I. Pigment Violet 19, C. I. Pigment Red 1, 2, 3, 5, 7, 9, 12, 17, 22 (Brilliant First Scarlet), 23, 31, 38, 48:1 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:2, 64:1, 81 (Rhodamine 6G lake), 83, 88, 92, 97, 101 (Red Iron Oxide), 104, 105, 106, 108 (Cadmium Red), 112, 114, 122 (dimethylquinacridone), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 254, 255, and 272.

Specific examples of the cyan pigments include C. I. Pigment Blue 1, 2, 3, 15 (Copper Phthalocyanine Blue R), 15:1, 15:2, 15:3 (Phthalocyanine Blue-G), 15:4, 15:6 (Phthalocyanine Blue E), 16, 17:1, 22, 56, 60, 63, 64, Vat Blue 4, and Vat Blue 60.

Also, specific examples of intermediate color pigments include, as intermediate colors for red, green, and blue, C. I. Pigment Red 177, 194, 224, C. I. Pigment Orange 16, 36, 43, 51, 55, 59, 61, 71, C. I. Pigment Violet 3, 19, 23, 29, 30, 37, 40, 50, C.I. Pigment Green 7 and 36.

In the ink to be used in the present invention, polymer microparticles containing a hydrophobic dye and pigment may be used to improve print density and print durability. The polymer microparticles which are used as a dispersion are more preferably a dispersion of polymer microparticles containing a pigment and particularly, an organic pigment or carbon black. Examples of the polymer used in the dispersion of the polymer microparticles containing pigments include vinyl polymers, polyester polymers, and polyurethane polymers. Among these polymers, vinyl polymers are preferable.

As the vinyl polymer, polymers are desirable which are obtained by copolymerizing a monomer composition containing (a) one or more types of vinyl monomers selected from the group consisting of acrylates, methacrylates, and styrene monomers, (b) a polymerizable unsaturated monomer having a salt forming group, and (c) a component copolymerizable with the above vinyl monomer and polymerizable unsaturated monomer having a salt forming group.

Examples of the vinyl monomer (a) include acrylates such as methylacrylate, ethylacrylate, isopropylacrylate, n-butylacrylate, t-butylacrylate, isobutylacrylate, n-amylacrylate, n-hexylacrylate, n-octylacrylate, and dodecylacrylate; methacrylates such as methylmethacrylate, isopropylmethacrylate, n-butylmethacrylate, t-butylmethacrylate, isobutylmethacrylate, n-amylmethacrylate, 2-ethylhexylmethacrylate, and laurylmethacrylate; and styrene monomers such as styrene, vinyltoluene, and 2-methylstyrene.

Examples of the polymerizable unsaturated monomer (h) having a salt forming group include cationic monomers having a salt forming group and anionic monomers having a salt forming group.

Examples of the cationic monomers having a salt forming group include unsaturated tertiary amine-containing monomers and unsaturated ammonium salt-containing monomers. Preferable examples of these monomers include N,N-diethylaminoethylacrylate, N—(N',N'-dimethylaminoethyl)acrylamide, vinylpyridine, 2-methyl-5-vinylpyridine, dimethylaminoethylmethacrylate, and diethylaminoethylmethacrylate.

Examples of the anionic monomers having a salt forming group include unsaturated carboxylic acid monomers, unsaturated sulfonic acid monomers, and unsaturated phosphoric acid monomers. Preferable examples of these monomers include acrylic acid, methacrylic acid, itaconic acid, maleic acid, and fumaric acid.

Examples of the components copolymerizable with a vinyl monomer and polymerizable unsaturated monomers having a salt forming group include acrylamide monomers, methacrylamide monomers, hydroxyl group-containing monomers, macromers each having a polymerizable functional group at its one terminal for example, silicone macromers, styrene macromers, polyester macromers, polyurethane macromers, polyalkyl ether macromers, and particularly, $CH_2=C(R^5)COO(R^6O)_pR^7$ (wherein $R^5$ represents a hydrogen atom or a lower alkyl group, $R^6$ represents a divalent hydrocarbon group which has 1 to 30 carbon atoms and may have a hetero atom, $R^7$ represents a monovalent hydrocarbon group which has 1 to 30 carbon atoms and may have a hetero atom, and p denotes an integer from 1 to 60). These monomers may be used either singly or in combinations of two or more. However, these monomers are examples and are not intended to be limiting of the present invention.

As the above hydroxyl group-containing monomer, 2-hydroxyethylacrylate and 2-hydroxyethylmethacrylate are preferable.

As the above macromer $CH_2=C(R^5)COO(R^6O)_pR^7$, polyethylene glycol (2 to 30) (meth)acrylate and methoxypolyethylene glycol (1 to 30) (meth)acrylate are preferable. The term "(meth)acrylate" represents acrylate or methacrylate in this description.

Among the above copolymerizable components, macromers are preferable and silicone macromers, styrene macromers, and polyalkyl ether macromers are more preferable.

The content of the vinyl monomer in the monomer composition is preferably 1 to 75% by mass, more preferably 5 to 60% by mass, and even more preferably 10 to 50% by mass from the viewpoint of the dispersion stability of the polymer emulsion.

The content of the polymerizable unsaturated monomer having a salt forming group in the monomer composition is preferably 2 to 40% by mass and more preferably 5 to 20% by mass from the viewpoint of the dispersion stability of the polymer emulsion.

The content of the monomer copolymerizable with the vinyl monomer and polymerizable unsaturated monomer having a salt forming group in the monomer composition is preferably 5 to 90% by mass, more preferably 10 to 85% by mass, and even more preferably 20 to 60% by mass from the viewpoint of the dispersion stability of the polymer emulsion.

The average particle diameter of the polymer microparticles is preferably 20 to 200 nm and the content of the polymer microparticles in the ink is preferably 10 to 40% by mass from the viewpoint of dispersion stability.

The above average particle diameter means a 50% average particle diameter (D50) measured at 23° C. in the condition of a particle refractive index of 1.51 and a particle density of 1.4 g/cm³ by using a Microtrac UPA-150 manufactured by Nikkiso Co., Ltd. and a sample diluted with pure water such that the concentration of pigment therein is 0.01% by mass and also using the parameter of pure water as the parameter of the solvent.

<Surfactants>

The surfactant is preferably those which prevent dispersion stability from being damaged by the type of colorant or a combination of humectants and have a low surface tension and high penetrability and leveling characteristics. The surfactant is therefore preferably at least one type selected from anionic surfactants, nonionic surfactants, silicone-based surfactants, and fluorine-based surfactants. Among these surfactants, silicone-based surfactants and fluorine-based surfactants are more preferable. These surfactants may be used in combinations of two or more.

As the fluorine-based surfactant, those having 2 to 16 carbon atoms substituted with fluorine are desirable and those having 4 to 16 carbon atoms substituted with fluorine are more desirable. When the number of carbon atoms substituted with fluorine is less than 2, there is the case where the effects of fluorine are not obtained, whereas when the number of carbon atoms substituted with fluorine exceeds 16, there is the case where problems concerning ink preservability and the like arise.

Examples of the fluorine-based surfactant include perfluoroalkylsulfonic acid compounds, perfluoroalkylcarboxylic acid compounds, perfluoroalkyl phosphate compounds, perfluoroalkylethylene oxide adducts, and polyoxyalkylene ether polymer compounds having a perfluoroalkyl ether group at their side chains. Among these compounds, polyoxyalkylene ether polymer compounds having a perfluoroalkyl ether group at their side chains are reduced in foaming ability and are therefore more preferable.

Fluorine-based surfactants represented by the following formula (I) are even more preferable.

Formula (I)

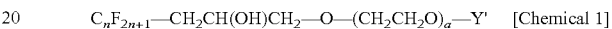

$C_nF_{2n+1}-CH_2CH(OH)CH_2-O-(CH_2CH_2O)_a-Y'$ [Chemical 1]

wherein n denotes an integer from 2 to 6, a denotes an integer from 15 to 50, and Y' represents $-C_bH_{2b+1}$ (b denotes an integer from 11 to 19) or $-CH_2CH(OH)CH_2-C_dF_{2d+1}$ (d denotes an integer from 2 to 6).

Examples of the perfluoroalkylsulfonic acid compound include perfluoroalkylsulfonic acid and a perfluoroalkylsulfonate.

Examples of the perfluoroalkylcarboxylic acid compound include perfluoroalkylcarboxylic acid and a perfluoroalkyl carboxylate.

Examples of the perfluoroalkylphosphoric acid compound include perfluoroalkyl phosphate and a salt of perfluoroalkyl phosphate.

Examples of the polyoxyalkylene ether polymer compound having a perfluoroalkyl ether group at its side chain include a polyoxyalkylene ether polymer having a perfluoroalkyl ether group at its side chain, a sulfate of a polyoxyalkylene ether polymer having a perfluoroalkyl ether group at its side chain, and a salt of polyoxyalkylene ether polymer having a perfluoroalkyl ether group at its side chain.

Examples of counter ions of the salts of these fluorine-based surfactants include Li, Na, K, $NH_4$, $NH_3CH_2CH_2OH$, $NH_2(CH_2CH_2OH)_2$, and $NH(CH_2CH_2OH)_3$.

As the fluorine-based surfactant, either those optionally synthesized or commercially available ones may be used. Examples of the commercially available fluorine-based surfactant include Surflon S-111, S-112, S-113, S-121, S-131, S-132, S-141, and S-145 (manufactured by Asahi Glass Co., Ltd.); Fluorad FC-93, FC-95, FC-98, FC-129, FC-135, FC-170C, FC-430, and FC-431 (manufactured by Sumitomo 3M limited); Megafac F-470, F-1405, and F-474 (manufactured by Dainippon Ink and Chemicals, Incorporated), Zonyl TBS, FSP, FSA, FSN-100, FSN, FSO-100, FSO, FS-300, and UR (manufactured by DuPont); FT-110, FT-250, FT-251, FT-400S, FT-150, and FT-400 SW (manufactured by NEOS Co., Ltd.); and Polyfox PF-151N (manufactured by Omnova Solutions Inc.). Among these products, FS-300 available from DuPont, FT-110, FT-250, FT-251, FT-400S, FT-150, and FT-400SW available from NEOS, and Polyfox PF-151N available from Omnova are more preferable from the viewpoint of good printing quality and particularly, significant improvements in color developing ability and leveling properties for paper.

Preferable examples of the fluorine-based surfactants include the following compounds.
(1) Anionic Fluorine-Based Surfactants

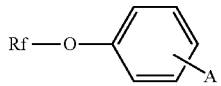

[Chemical 2]

In the above formula, Rf represents a mixture of fluorine-containing hydrophobic groups represented by the following formula. A represents $SO_3X$, COOX, or $PO_3X$ (wherein X represents a counter anion and specific examples of X include a hydrogen atom, Li, Na, K, $NH_4$, $NH_3CH_2CH_2OH$, $NH_2(CH_2CH_2OH)_2$, or $NH(CH_2CH_2H)_3$.

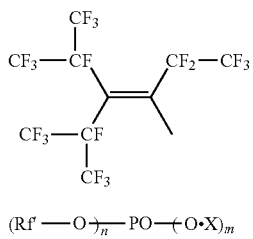

[Chemical 3]

$(Rf'\!-\!O)_n\!-\!PO\!-\!(O\cdot X)_m$

[Chemical 4]

In the above formula, Rf' represents a fluorine-containing group represented by the following formula, X has the same meanings as above, n denotes an integer of 1 or 2, and m denotes 2–n.

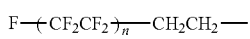

[Chemical 5]

In the above formula, n represents an integer from 3 to 10.

$Rf'\!-\!S\!-\!CH_2CH_2\!-\!COO.X$ [Chemical 6]

In the above formula, Rf' and X have the same meanings as above, $Rf'\!-\!SO_3.X$ [Chemical 7]

In the above formula, Rf' and X have the same meanings as above.
(2) Nonionic Fluorine-Based Surfactant

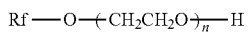

[Chemical 8]

In the above formula, Rf has the same meanings as above and n denotes an integer from 5 to 20.

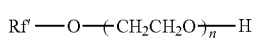

[Chemical 9]

In the above formula, Rf' has the same meaning as above and n denotes an integer from 1 to 40.

(3) Amphoteric Fluorine-Based Surfactant

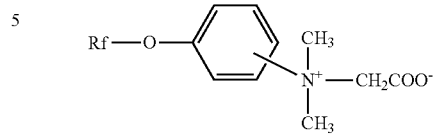

[Chemical 10]

In the above formula, Rf has the same meaning as above.
(4) Oligomer Type Fluorine-Based Surfactant

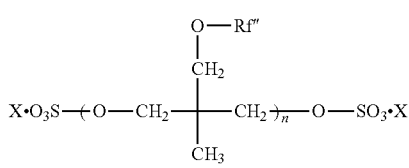

[Chemical 11]

In the above formula. Rf' represents a fluorine-containing group represented by the following formula, n denotes an integer from 1 to 10, and X has the same meaning as above.

$F\!-\!(CF_2CF_2)_n\!-\!CH_2\!-$ [Chemical 12]

In the above formula, n denotes an integer from 1 to 4.

No particular limitation is imposed on the above silicone-based surfactants and any silicone-based surfactant may be appropriately selected according to the object. However, silicone-based surfactants which are not decomposed at high pHs are preferable and examples of the silicone-based surfactant include side-chain modified polydimethylsiloxane, both-terminal modified polydimethylsiloxane, one-terminal modified polydimethylsiloxane, side-chain and both-terminal modified polydimethylsiloxane. Polyether modified silicone-based surfactants having a polyoxyethylene group or polyoxyethylene-polyoxypropylene group exhibit good quality as an aqueous surfactant and are therefore more preferable.

As such a surfactant, either those which are optionally synthesized or those which are commercially available may be used. The commercially available surfactants can be easily obtained from, for example, BYK Japan KK, Shin-Etsu Chemical Co., Ltd., or Dow Corning-Toray Co., Ltd.

No particular limitation is imposed on the above polyether modified silicone-based surfactant and a desired one may be selected according to the object. Examples of the polyether modified silicone-based surfactant include compounds obtained by introducing a polyalkylene oxide structure represented by the following formula into the side chain of the Si part of dimethylpolysiloxane.

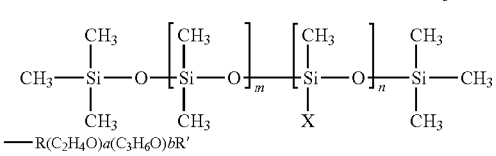

[Chemical 13]

In the above formula, m, n, a, and b respectively represent an integer and R ad R' respectively represent an alkyl group or an alkylene group.

As the polyether modified silicone-based surfactant, commercially available products may be used and examples of the polyether modified silicone-based surfactant include KF-618, KF-642, and KF-643 (manufactured by Shin-Etsu Chemical Co., Ltd.).

Examples of the above anionic surfactant include polyoxyethylene alkyl ether acetate, dodecylbenzenesulfonate, laurate, and polyoxyethylene alkyl ether sulfate.

Examples of the nonionic surfactant include polyoxyethylene alkyl ether, polyoxypropylene-polyoxyethylene alkyl ether, polyoxyethylene alkyl ester, polyoxyethykenesorbitan fatty acid ester, polyoxyethylene alkylphenyl ether, polyoxyethylene alkylamine, and polyoxyethylene alkylamide.

The content of the surfactant in the ink is preferably 0.01 to 3.0% by mass and more preferably 0.03 to 2.0% by mass.

When the content is less than 0.01% by mass, the effect obtained by adding the surfactant is not obtained whereas when the content exceeds 3.0% by mass, the penetrability of the ink into a recording medium is excessively increased and there is therefore the case where image density is dropped and a print-through phenomenon occurs.

<Water-Soluble Organic Solvent>

It is necessary to add a water-soluble organic solvent in the ink to prevent the ink from drying and to improve dispersion stability.

Examples of the water-soluble organic solvent include the following compounds. These water-soluble organic solvents may be used in combinations of two or more:

Polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, 1,5-pentanediol, 1,6-hexanediol, glycerin, trimethylol ethane, trimethylol propane, 1,2,3-butane triol, 1,2,4-butane triol, 1,2,6-hexane triol, and petriol;

Polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether;

Polyhydric alcohol aryl ethers such as ethylene glycol monophenyl ether, ethylene glycol monobenzyl ether;

Nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone;

Amides such as formamide, N-methylformamide, and N,N-dimethylformamide;

Amines such as monoethanolamine, diethanolamine, triethanolamine, monoethylamine, diethylamine, and triethylamine;

Sulfur-containing compounds such as dimethyl sulfoxide, sulfolane, and thiodiethanol;

Propylene carbonate, and ethylene carbonate.

Besides the above water-soluble organic solvents, other humectant may be used. As such a humectant, those containing a urea compound or sugar are preferable. Examples of the saccharides include monosaccharide, disaccharide, oligosaccharide (including trisaccharide and tetrasaccharide), and polysaccharides and preferably include glucose, mannose, fructose, ribose, xylose, arabinose, galactose, maltose, cellobiose, lactose, sucrose, trehalose, and maltotriose. Here, the polysaccharides means saccharides in a broad sense and is used in the sense that it includes materials such as α-cyclodextrin and cellulose widely existing in nature.

Examples of derivatives of these saccharides include reduced saccharides of the aforementioned saccharides (for example, sugar alcohols (formula $HOCH_2(CHOH)_nCH_2OH$ (n is an integer from 2 to 5))), sugar oxides (for example, aldonic acid and uronic acid), amino acid, and thio acid. Sugar alcohols are more preferable and specific examples of the sugar alcohols include D-sorbitol, sorbitan, maltitol, erythritol, lactitol, and xylitol.

Particularly, in the present invention, ink superior in storage stability and discharge stability can be manufactured when diethylene glycol, triethylene glycol, propylene glycol, dipropylene glycol, 1,3-butanediol, 3-methyl-1,3-butanediol, 1,5-pentanediol, 1,6-hexanediol, trimethylolpropane, tetramethylolpropane, D-sorbitol, or xylitol is used.

In the case of pigment ink, the ratio of the pigment to the water-soluble organic solvent largely affects the discharge stability of the ink from the head. When the amount of the water-soluble organic solvent to be formulated is small though the ratio of the solid of the pigment is high, the vaporization of water in the vicinity of the ink meniscus of the nozzle progresses, bringing about discharge inferior.

The amount of the water-soluble organic solvent to be formulated is preferably about 10 to 50% by mass based on the whole ink.

<Other Components>

As other components, conventionally known various materials may be used. Examples of these other components include a foam inhibitor, pH regulator, antiseptic and antimold agent, rust preventive agent, chelating reagent, antifoaming agent, and penetrating agent, which are, however, not intended to be limiting of the present invention.

The foam inhibitor is added to inhibit the foaming of ink. Examples of the foam inhibitor include compounds represented by the following formula.

Formula (II)

[Chemical 14]

In the formula, R1 and R2 respectively represent an alkyl group having 3 to 6 carbon atoms, R3 and R4 respectively represent an alkyl group having 1 or 2 carbon atoms, and m denotes an integer from 1 to 6.

Among these compounds, 2,4,7,9-tetramethyldecane-4,7-diol produces excellent effects on foam inhibition.

The pH regulator is added with the intension of keeping ink in an alkaline state to stabilize the dispersion state, thereby stabilizing discharge state. However, when the pH is 11 or more, the head and ink supply units of an inkjet recording device are largely eroded, easily posing problems concerning denaturing, leakage, and discharge inferior of ink depending on the material of the head and units when the inkjet recording device is used for a long period of time. In the case of a pigment, a pH regulator is added when the pigment is kneaded and dispersed together with a dispersant in water. This is more preferable as compared with the case of adding this pH regulator together with a humectants and penetrating agent after the kneading and dispersion operations are finished. This is because there is the case where the dispersion is broken by the addition of the pH regulator depending on the pH regulator.

As the pH regulator, one containing at least one type selected from alcohol amities, alkali metal hydroxides, ammonium hydroxides, phosphonium hydroxides, and alkali metal carbonates is preferable.

Examples of the alcohol amines include diethanol amine, triethanol amine, and 2-amino-2-ethyl-1,3-propanediol. Examples of the alkali metal hydroxides include lithium hydroxide, sodium hydroxide, and potassium hydroxide. Examples of the ammonium hydroxides include ammonium hydroxide and quaternary ammonium hydroxide. Examples of the phosphonium hydroxides include quaternary phosphonium hydroxide. Examples of the alkali metal carbonates include lithium carbonate, sodium carbonate, and potassium carbonate.

Examples of the antiseptic and anti-mold agent include sodium dehydroacetate, sodium sorbate, sodium 2-pyridinethiol-1-oxide, sodium benzoate, and sodium pentachlorophenolate.

Examples of the rust-preventive agent include acidic sulfite, sodium thiosulfate, ammonium thioglycolate, diisopropylammonium nitrite, pentaerythritol tetranitrate, and dicyclohexylammonium nitrite.

Examples of the chelating reagent include sodium ethylenediaminetetraacetate, sodium nitrilotriacetate, sodium hydroxyethylethylenediaminetriacetate, sodium diethylenetriaminepentaacetate, and sodium uramildiacetate.

<Properties>

The viscosity, static surface tension, and pH of the ink used in the present invention may be optionally selected corresponding to the object of use.

The viscosity at 25° C. is preferably in a range from 3 to 20 mPa·s and more preferably in a range from 6 to 12 mPa·s. This can improve discharge stability and image quality to a higher level.

The static surface tension is preferably 19 to 55 mN/m at 25° C. When the static surface tension is 19 mN/m or more at 25° C., stable jetting can be attained without the occurrence of blurring on paper. Also, when the static surface tension is 55 mN/m or less at 25° C., the penetration of ink into paper can be improved and therefore, drying time can be shortened.

Also, the pH is preferably 7 to 10.

<Colorization>

No particular limitation is imposed on the color of the ink used in the present invention and a desired color may be optionally selected according to the object. Examples of the color include yellow, magenta, and cyan. A multicolor image can be formed by recording using an ink set obtained by combining two or more types of inks and a full-color image can be formed by recording using an ink set obtained by combining all colors.

Also, though an ink set including aqueous inks having two or more colors including black is used in the invention of claim 2, color inks other than black ink are the same as above.

<Ink Cartridge>

The cartridge obtained by filling aqueous ink according to the ink set of the present invention is one in which each ink included in the above ink set is accommodated in a container and other members optionally selected according to the need are contained. There is no particular limitation to the container and its shape, structure, size, and material may be optionally selected corresponding to the object. Examples of the container include a plastic container and those containing ink bags formed of an aluminum laminate film.

Figure 11:
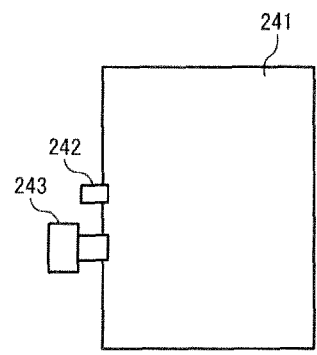
FIG. 11 is a view showing an example of an ink cartridge.
Figure 12:
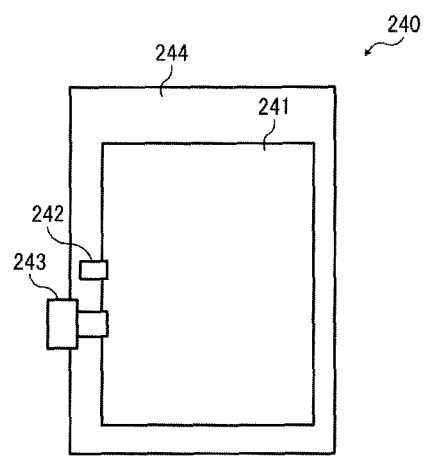
FIG. 12 is a view including a case (package) besides the ink cartridge of FIG. 11.

Specific examples of the container include those having the structures shown in FIGS. 11 and 12. FIG. 11 is a view showing an example of an ink cartridge and FIG. 12 is a view including a case (package) of the ink cartridge of FIG. 11.

Ink is filled in an ink bag 241 from an ink injection port 242, the ink bag is evacuated, and then, the ink injection port is closed by fusion. In actual use, a needle attached to the device body is stuck in an ink outlet 243 made of a rubber member to supply the ink to the device. The ink bag 241 is formed of a package member such as an aluminum laminate film having no air permeability. This ink bag 241 is, as shown in FIG. 12, accommodated in a cartridge case 244 usually made of a plastic and is used as a cartridge 240 in such a manner as to be dismountable from various inkjet recording devices.

This ink cartridge preferably houses each ink of the above ink set, can be used in such a manner as to be dismountable from various inkjet devices, and is used in such a manner as to be dismountable from the inkjet recording device which will be explained later.

<Inkjet Recording Method and Inkjet Recording Device>

In succession, the inkjet recording method and inkjet recording device of the present invention will be explained with reference to the drawings.

Figure 13:
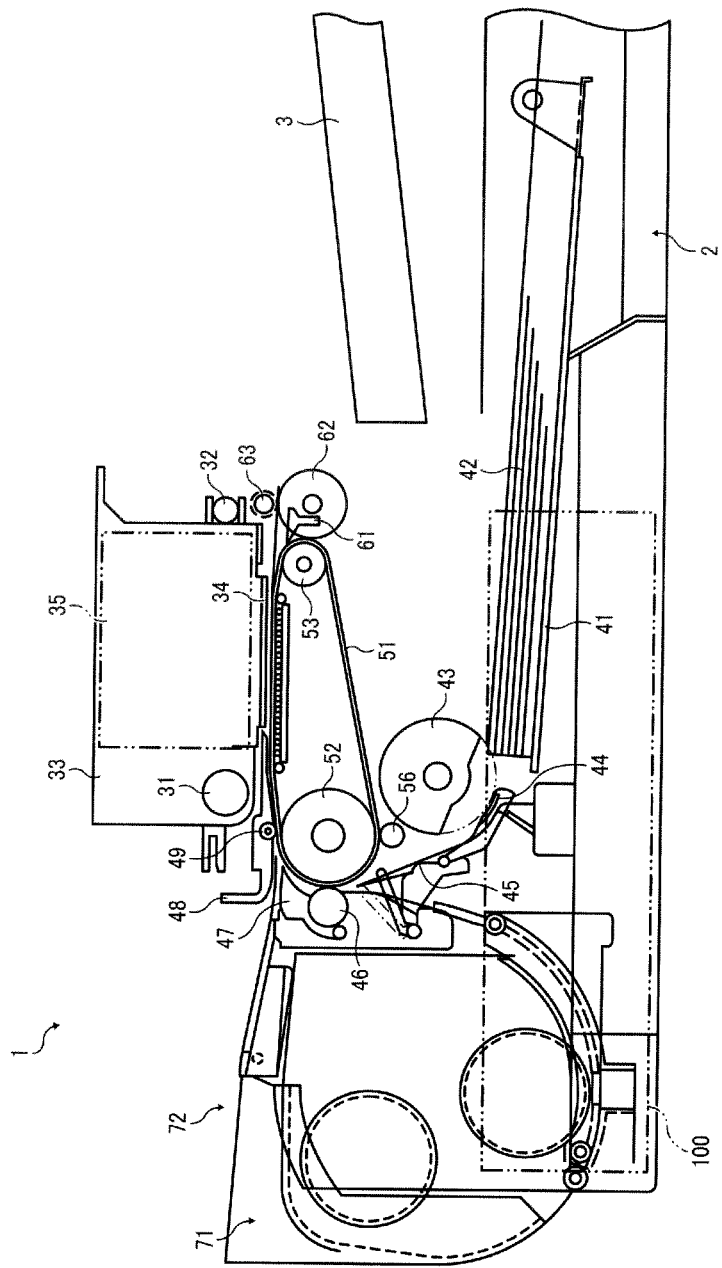
FIG. 13 is a side view for explaining the whole structure of an example of an inkjet recording device according to the present invention.
Figure 14:
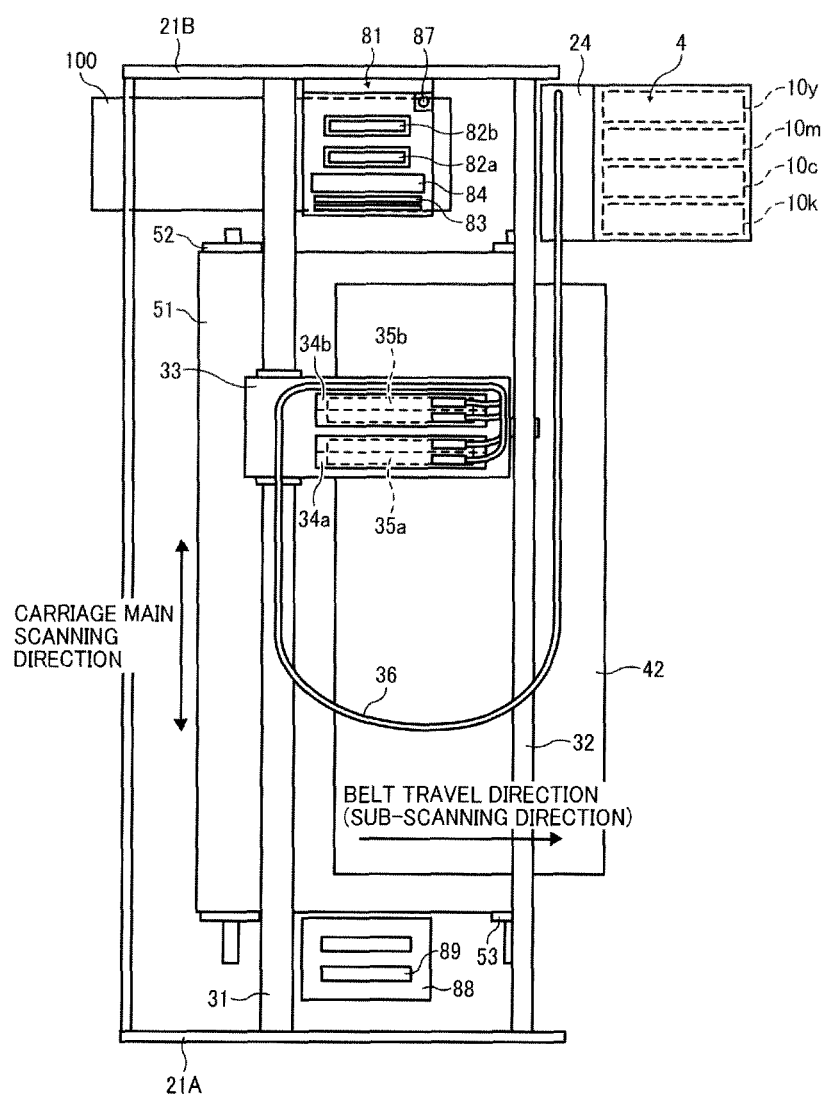
FIG. 14 is a main part plan view for explaining the whole structure of an example of an inkjet recording device according to the present invention.

FIGS. 13 and 14 are views showing an example of the inkjet recording device of the present invention, wherein FIG. 13 is a side view for explaining the whole structure and FIG. 14 is a main part plan view.

This inkjet recording device is a serial type inkjet recording device in which a carriage 33 is supported in such a manner as to be slidable in a scanning direction by principal and accessory guide rods 31 and 32 which are guide members horizontally installed between left and right side plates 21A and 21B of a device body 1 and moved to scan in the direction (main scan direction of the cartridge) of the arrow of FIG. 14 via a timing belt by a main scan motor (though not shown).

In this carriage 33, recording heads 34a and 34b (referred to as "recording head 34" when these recording heads are not distinguished) constituted of liquid discharge heads that eject each color ink droplet of yellow (Y), cyan (C), magenta (M), and black (K) are installed such that a series of nozzles including a plurality of nozzles are arranged in a vertical scanning direction perpendicular to the main scanning direction with each ink droplet discharge port facing downward.

The recording heads 34 each have two nozzle arrays. One nozzle array of the recording head 34a ejects liquid droplets of black (K) and the other nozzle array ejects liquid droplets of cyan (C). One nozzle array of the recording head 34b ejects liquid droplets of magenta (NI) and the other nozzle array ejects liquid droplets of yellow (Y). In this case, a recording head provided with a nozzle array of each color by arranging a plurality of nozzles on one nozzle surface may also be used as the recording head 34.

Also, the carriage 33 is mounted with sub tanks 35a and 35b (referred to as "sub tank 35" when these sub tanks are not distinguished) which are each a sub tank as a second ink supply section that supplies each color ink corresponding to the nozzle array of the recording head 34. A recording liquid of each color is replenished and supplied to the sub tank 35 from an ink cartridge of each color (main tank) 10y, 10m, 10c, or 10k which is installed in a freely dismountable manner in a cartridge installing section 4 by a supply pump unit 24 via each color supply tube 36.

As a paper feed section that feeds a paper sheet 42 stacked on a paper sheet stacking section (platen) of a paper feed tray 2, a semicircular roller (paper feed roller) 43 and a separation pad 44 made of a material having a large friction coefficient and disposed facing the semicircular roller 43 are disposed, wherein the separation pad 44 is forced toward the paper feed roller 43 side.

Then, in order to feed the paper sheet 42 fed from the paper feed section to the underside of the recording head 34, the inkjet recording device is also provided with a guide member 45 that guides the paper sheet 42, a counter roller 46, a carry guide 47, and a pressing member 48 provided with an end pressure roller 49 and also, a conveyer belt 51 which is a conveying means that electrostatically adsorbs the fed paper sheet 42 to convey the paper sheet at a position facing the recording head 34.

This conveyer belt 51 is an endless belt and has such a structure that it is stretched between a carrier roller 52 and a tension roller 53 and goes around in a belt conveying direction (vertical scanning direction). Also, the inkjet recording device is provided with a charge roller 56 which is a charge means that charges the surface of the conveyer belt 51. This charge roller 56 is disposed such that it contacts with the surface layer of the conveyer belt 51 and rotates following the rotation of the conveyer belt 51. This conveyer belt 51 is moved in the conveying direction of the belt as shown in FIG. 14 by the rotation of the conveyer roller 52 driven through timing by a subscan motor (not shown).

Moreover, the inkjet recording device is provided with a separation pawl 61 that separates the paper sheet 42 from the conveyer belt 51, a paper delivery roller 62, and a spur 63 which is a paper delivery roller and also provided with a paper delivery tray 3 below the paper delivery roller 62 as a paper delivery section that delivers the paper sheet 42 in which data is recorded by the recording head 34.

Also, a duplicate unit 71 is mounted on the backside of the device body 1 in a freely dismountable manner. This duplicate unit 71 takes in the paper sheet 42 returned by the rotation of the conveyer belt 51 in a reverse direction and inverts the direction of the paper sheet 42 to feed the paper sheet again to the position between the counter roller 46 and the conveyer belt 51. The upper surface of the duplicate unit 71 is a manual bypass tray 72.

Moreover, a maintenance and restoration mechanism 81 that maintains and restores the condition of the nozzles of the recording head 34 is disposed in a non-printing region on one side of the carriage 33 in a scan direction. This maintenance and restoration mechanism 81 is provided with, for example, each cap member (hereinafter referred to as "cap") 82a and 82b (referred to as "cap 82" when these caps are not distinguished) that caps each nozzle surface of the recording head 34, a wiper (wiper blade) 83 that wipes the surface of the nozzle, an idle ejection receiver 84 that receives liquid droplets when idle ejection for ejecting liquid droplets contributing nothing to recording is performed to eject thickened recording solution, and a carriage lock that locks the carriage 33. Also, a waste liquid tank 100 that receives waste liquid generated by maintenance and restoration action is attached to the device body in an exchangeable manner on the lower side of the maintenance and restoration mechanism 81 of this head.

Also, an idle ejection receiver 88 that receives recording liquid when idle ejection for ejecting liquid droplets contributing nothing to recording is performed to eject a recording solution thickened during recording and the like is disposed in a non-printing region on the other side of the carriage 33 in a scan direction. This idle ejection receiver 88 is provided with, for example, an opening 89 along the direction of the nozzle array of the recording head 34.

In the inkjet recording device constituted in this manner, the paper sheets 42 are separately fed one by one from the paper feed tray 2, the paper sheet 42 fed upward in almost a vertical direction is guided by the guide 45, and is then conveyed in the condition that it is sandwiched between the conveyer belt 51 and the counter roller 46. Further, the paper sheet 42 is conveyed such that its top is guided by the carry guide 47 and pressed against the conveyer belt 51 by the top pressure roller 49 to turn its conveying direction at almost 90 degrees.

At this time, voltage is applied to the charge roller 56 by repeating a plus output and a minus output alternately, so that the conveyer belt 51 is charged according to an alternate voltage pattern. When the paper sheet 42 is fed on the charged conveyer belt 51, the paper sheet 42 is adsorbed to the conveyer belt 51 and the paper sheet 42 is conveyed in a vertical scan direction by the circulation movement of the conveyer belt 51.

In light of this, ink droplets are ejected on the suspended paper sheet 42 to thereby print one line by driving the recording head 34 corresponding to image signals while moving the carriage 33. After the paper sheet 42 is conveyed at a predetermined distance to print the next line. When recoding finish signals or signals that the backend of the paper sheet 42 reaches a recording region are received, the recording operation is suspended to deliver the paper sheet 42 to the paper delivery tray 3.

Then, when the maintenance and restoration of the nozzle of the recording head 34 are performed, the carriage 33 is transferred to a position which is the home position facing the maintenance and restoration mechanism 81 to perform maintenance and restoration operations including nozzle suction in which the carriage 33 is capped by the cap member 82 to carry out suction from the nozzle and idle discharge operation for ejecting liquid droplets which do not contribute to the formation of an image, whereby an image can be formed by stable ejection of liquid droplets.

Figure 15:
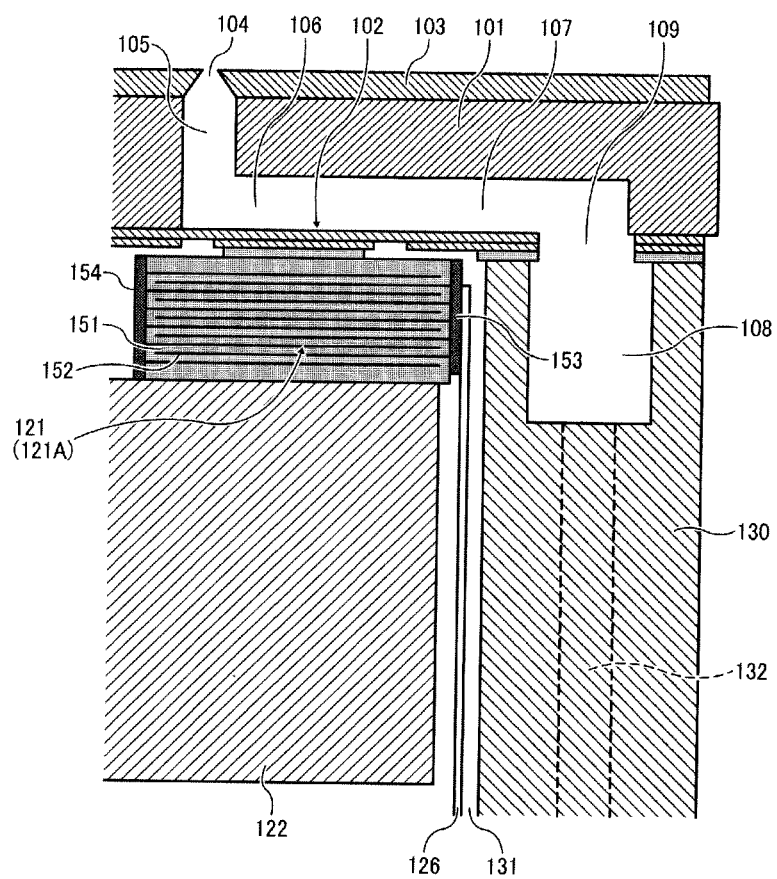
FIG. 15 is a sectional view along the longitudinal direction of a liquid chamber to show one example of a liquid discharge head constituting a recording head of an inkjet recording device according to the present invention.
Figure 16:
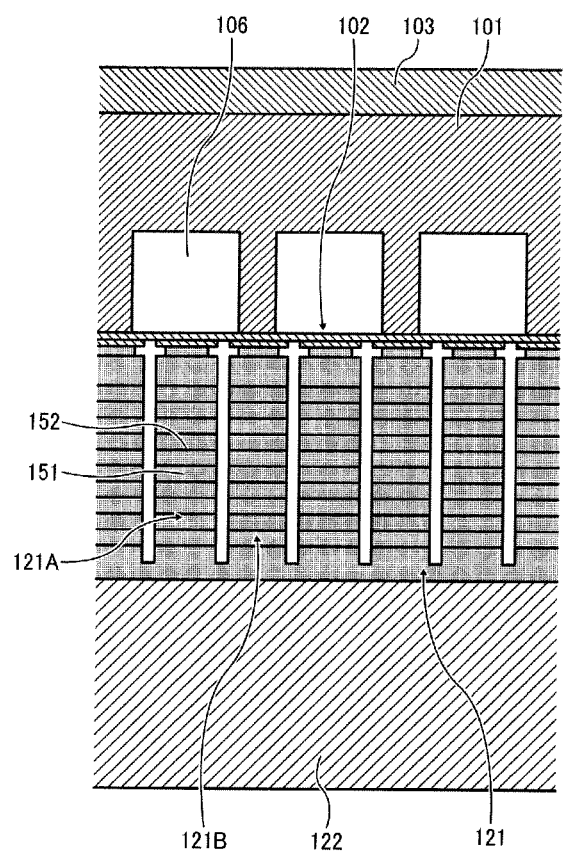
FIG. 16 is a sectional view along the short-length direction of a liquid chamber to show one example of a liquid discharge head constituting a recording head of an inkjet recording device according to the present invention.

Next, an example of a liquid discharge head constituting the recording head 34 will be explained with reference to FIGS. 15 and 16. FIG. 15 is a sectional view along the longitudinal direction of the liquid chamber of the liquid discharge head and FIG. 16 is a sectional view of the liquid discharge head in the short side (direction in which the nozzles are arranged) of the liquid chamber.

The liquid discharge head is configured by laminating a flow passage plate 101, a vibration plate 102 bonded to the backside of the flow passage plate 101, and a nozzle plate 103 bonded to the front side of the flow passage plate 101. This configuration forms a nozzle communication passage 105 which is a passage communicated with the nozzle 104 that ejects liquid droplets (ink droplets), a pressure liquid chamber 106 as a chamber for generating pressure, and an ink supply port 109 communicated with a common liquid chamber 108 that supplies ink to the pressure liquid chamber 106 through a flow resistance member (supply passage) 107.

The liquid discharge head is also provided with two laminate type piezoelectric elements 121 (only one row is shown in FIG. 15) as electromechanical conversion elements that are each a pressure generating means (actuator) which increases the pressure of ink in the pressure liquid chamber 106 by deforming the vibration plate 102 and with a base substrate 122 that bonds and secures this piezoelectric elements 121. This piezoelectric element 121 is formed with a plurality of piezoelectric element pillars 121A and 121B by forming grooves by non-divided slit processing. In this example, the piezoelectric element pillar 121A is a drive piezoelectric element pillar that applies a drive waveform and the piezoelectric element pillar 121B is designed to be a non-drive piezoelectric element pillar that applies no drive waveform. Also, a FPC cable 126 mounted with a drive circuit (drive IC) (not shown) is connected with the drive piezoelectric element pillar 121A of the piezoelectric element 121.

Then, the peripheral part of the vibration plate 102 is bonded with a frame 130, and this frame 130 is formed with a through-hole 131 that receives an actuator unit constituted of, for example, the piezoelectric element 121 and base substrate 122, a concave part as the common liquid chamber 108, and an ink supply hole 132 that is a liquid supply port for supplying ink to this common liquid chamber 108 from the outside.

Here, the flow passage plate 101 is produced by forming concave parts and hole parts which are to be the nozzle communication passage 105 and the pressure liquid chamber 106 by carrying out anisotropic etching of a single crystal silicon substrate of plane orientation (110) by using an alkali etching solution such as an aqueous potassium hydroxide solution (KOH). However, the present invention is not limited to this single crystal silicon substrate and other stainless substrate or photosensitive resin may also be used.

The vibration plate 102 is made of a nickel metal plate and is produced by, for example, an electroforming method. However, members joined with a metal plate, metal, or resin plate and the like may be used. The piezoelectric element pillars 121A and 121B of the piezoelectric element 121 of the vibration plate 102 are bonded with this vibration plate 102 by using an adhesive and also, the frame 130 is bonded with the vibration plate 102 by an adhesive.

The nozzle plate 103 is formed with nozzles 104 having a diameter of 10 μm to 30 μm corresponding to each pressure chamber 106 and these nozzles 104 are bonded with the flow passage plate 101. This nozzle plate 103 is obtained by forming a water repellent film on the outermost surface via a predetermined layer on the surface of the nozzle-forming member made of a metal member.

The piezoelectric element 121 is a laminate type piezoelectric element (here, PZT) produced by alternately laminating a piezoelectric material 151 and an internal electrode 152. An individual electrode 153 and a common electrode 154 are connected with each internal electrode 152 drawn over the alternately different end surface of the piezoelectric element 121. This embodiment has a structure in which the pressure of the ink in the pressure liquid chamber 106 is increased using displacement in a d33 direction as the piezoelectric direction of the piezoelectric element 121. However, a structure may be adopted in which the pressure of the ink in the pressure liquid chamber 106 is increased using a displacement in a d31 direction as the piezoelectric direction of the piezoelectric element 121.

In the liquid discharge head constituted in the above manner, the drive piezoelectric element pillar 121A is shrunk, for example, by dropping the voltage applied to the piezoelectric element 121 from a standard potential Ve, so that the vibration plate 102 descends to expand the volume of the pressure liquid chamber 106, thereby flowing the ink into the pressure liquid chamber 106. Then, the voltage to be applied to the drive piezoelectric element pillar 121A is increased to extend the drive piezoelectric element pillar 121A in the direction of lamination to thereby deform the vibration plate 102 in the direction of the nozzle 104, whereby the volume of the pressure liquid chamber 106 is shrunk to increase the pressure of the ink in the pressure liquid chamber 106, with the result that ink droplets are ejected (jetted) from the nozzle 104.

Then, the vibration plate 102 is returned to the original position and the pressure liquid chamber 106 is expanded to generate negative pressure by returning the voltage applied to the drive piezoelectric element pillar 121A to the standard potential. At this time, ink is filled in the pressure liquid chamber 106 from the common liquid chamber 108. Then, the vibration of the meniscus surface of the nozzle 104 is attenuated and stabilized, and then, the stage is shifted to the operation for ejecting the next liquid droplet.

In this case, this head driving method is not limited to the above example (pull-press print) and pull-print, press-print, or the like may be performed by properly changing the way of applying a drive waveform.

Figure 17:
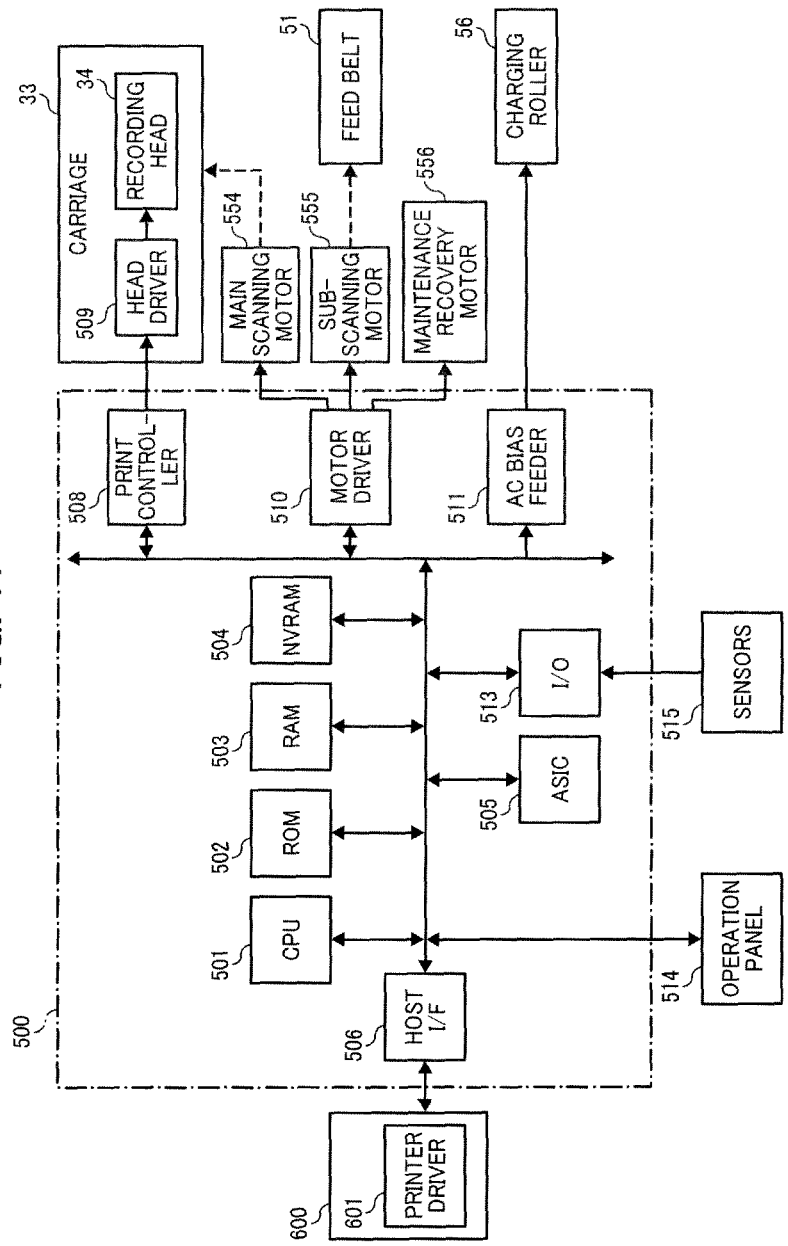
FIG. 17 is a block explanatory view showing the outline of an example of a control section of an inkjet recording device according to the present invention.

Next, the outline of the control section of the inkjet recording device will be explained with reference to FIG. 17 used as a block explanatory view.

A control section 500 is provided with a CPU 501 that controls this whole system and doubles as a means that controls an idle discharge operation according to the present invention, a ROM 502 that stores programs executed by the CPU 501 and other fixed data, a RAM 503 that temporary stores image data and the like, a rewritable nonvolatile memory 504 that retains data even when the power source of the device is cut off, and an ASIC 505 that treats various signals for image data, images for sorting or the like, and other input and output signals for controlling the whole device.

The control section 500 is also provided with a print control section 508 including a data transfer section and a drive signal generation section for driving and controlling the recording head 34, a head driver (driver IC) 509 that controls the recording head 34 disposed on the carriage 33 side, a motor control section 510 that drives the main scan motor 554 which moves and scans the carriage 33, a subscan motor 555 which circularly moves the conveyer belt 51 and a maintenance and restoration motor 556 that transfers the cap 82 and wiper member 83 of the maintenance and restoration mechanism 81, and an AC bias supply section 511 that supplies an AC bias to the charge roller 56.

Also, a control panel 514 that inputs and displays information necessary for this device is connected with this control section 500. This control section 500 is provided with an I/F 506 that sends and receives data and signals to/from the host side and receives information from the host 600 side such as information processing devices such as a personal computer, image reading devices such as an image scanner, and image pickup devices such as a digital camera via cables and networks.

Then, the CPU 501 of the control section 500 reads and analyzes print data in a receiver buffer contained in the I/F 506 to perform image treatment and data sorting treatment and transfer this image data to the head driver 509 from the print control section 508. In this case, a dot data pattern used to output an image is generated by a printer driver 601 on the host 600 side.

The print control section 508 transfers the aforementioned image data in the form of serial data and outputs transfer clock and latch signals and control signals required to transfer this image data and to confirm this transfer to the head driver 509. Besides, the print control section 508 also includes a D/A converter that converts the pattern data of the drive pulse stored in the ROM and a drive signal generating section constituted of a voltage amplifier and a current amplifier to output specified signals to be used in the present invention to the head driver 509.

The head driver 509 selects drive pulses constituting a drive waveform supplied from the print control section 508 based on a serially input image data corresponding to one line for the recording head 34 to produce a drawing pulse and discharge pulse to apply these pulses to the piezoelectric elements used as a pressure generating means that generates energy for liquid droplets in the recording head 7, thereby driving the recording head 34. At this time, a part or all of the drive pulses constituting the drive signals and a part or all of the waveform elements generating drive pulses are selected to thereby print dots differing in size such as a large droplet, intermediate droplet, and small droplet dividedly.

The I/O section 513 gets information from various sensor groups 515 installed in the device, extracts information necessary for print control, and uses the information to control the print control section 508, motor control section 510, and AC bias supply section 511. The sensor groups 515 include an optical sensor that detects the position of the paper sheet, a thermistor that monitors the temperature in the device, a sensor that monitors the voltage of the charged belt, and an interlock switch that detects whether the cover is closed or opened, showing that the I/O section 513 can treat various sensor information data.

Figure 18:
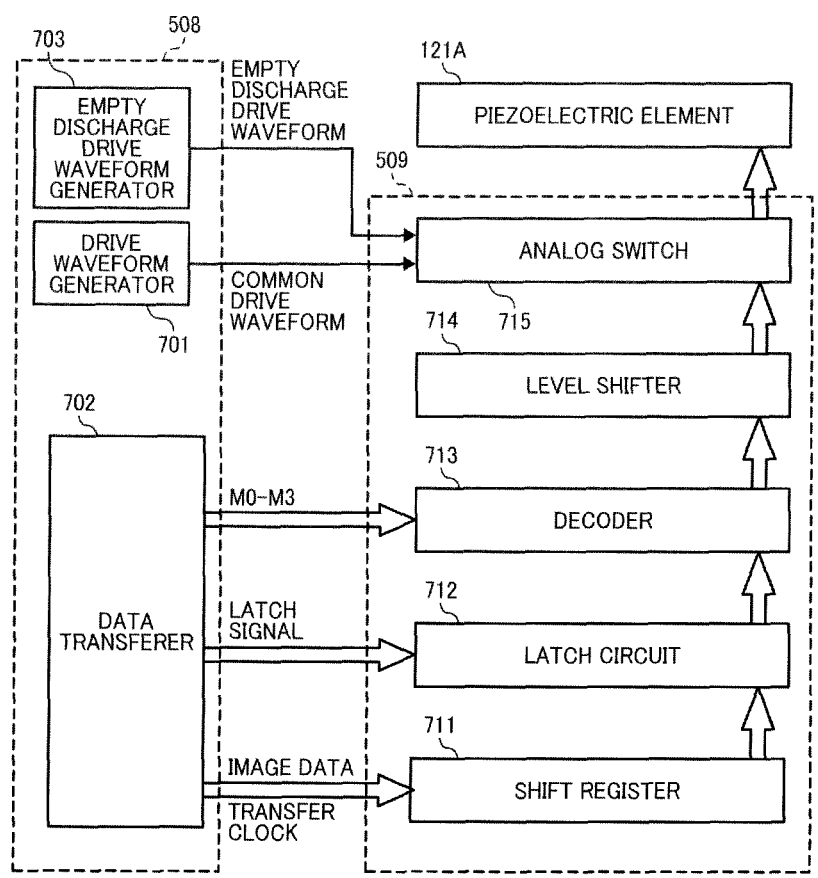
FIG. 18 a block explanatory view showing an example of a print controller and a head driver in an inkjet recording device according to the present invention.

Next, an example of the print control section 508 and head driver 509 will be explained with reference to FIG. 18.

The print control section 508 is provided with a drive waveform generation section 701 that generates signals having a drawing pulse within one print period when an image is formed, a data transfer section 702 that outputs 2-bit image data (gradation signals 0 and 1) corresponding to a printed image, clock signals, latch signals (LAT), and droplet control signals M0 to M3, and an idle discharge drive waveform generation section 703 that generates and outputs an idle discharge drive waveform.

In this case, the droplet control signals are 2-bit signals indicating, every droplet, the opening/closing of an analog switch 715 that is a switching means of the head driver 509 and transits to a H-level (ON) state in drive pulse or waveform element to be selected according to the print period of the common drive waveform and to a L-level (OFF) during unselected period.

The head driver 509 is provided with a shift register 711 that inputs a transfer clock (shift clock) and serial image date (gradation data: 2-bit/1-channel (1 nozzle)) from the data transfer section 702, a latch circuit 712 that latches each resist value of the shift register 711 by latch signals, a decoder 713 that decodes the gradation data and control signals M0 to M3 to output the results, a level shifter 714 that shifts logic level voltage signals of the decoder 713 to a level that can be operated by the analog switch 715, and an analog switch 715 that is turned on/off (open/close) by the output from the decoder 713 which is supplied through the level shifter 714.

<Recorded Product>

The recorded product of the present invention has an image formed on a recording medium by using the inkjet recording method of the present invention.

EXAMPLES

The present invention will be explained in more detail by way of examples and comparative examples, which are, however, not intended to be limiting of the present invention, in which all designations of "%" indicate "mass percentage (mass %)".

<Preparation of a Pigment Dispersion>

(Dispersion 1: Cyan Dispersion)

The atmosphere in a 1 L flask equipped with a mechanical stirrer, a temperature gauge, a nitrogen gas introduction tube, a reflux condenser, and a dropping funnel was substituted with nitrogen. Then, the flask was charged with 11.2 g of styrene, 2.8 g of acrylic acid, 12.0 g of laurylmethacrylate, 4.0 g of polyethylene glycol methacrylate, 4.0 g of a styrene macromer (trade name: AS-6, manufactured by Toagosei Co., Ltd.), and 0.4 g of mercaptoethanol and the mixture was heated to 65° C. Next, a mixture solution of 100.8 g of styrene, 25.2 g of acrylic acid, 108.0 g of laurylmethacrylate, 36.0 g of polyethylene glycol methacrylate, 60.0 g of hydroxyethylmethacrylate, 36.0 g of a styrene macromer (trade name: AS-6, manufactured by Toagosei Co., Ltd.), 3.6 g of mercaptoethanol, 2.4 g of azobisdimethylvaleronitril, and 18 g of methyl ethyl ketone was added dropwise in the flask for 2.5 hr. Then, a mixture solution of 0.8 g of azobisdimethylvaleronitril and 18 g of methyl ethyl ketone was added dropwise in the flask for 0.5 hr and the mixture was aged at 65° C. for 1 hr. Then, 0.8 g of azobisdimethylvaleronitril was added and the mixture was further aged for 1 hr. After the reaction was completed, 364 g of methyl ethyl ketone was added in the flask to obtain 800 g of a polymer solution having a concentration of 50%.

Next, a part of the polymer solution was dried to measure by gel permeation chromatography (standard: polystyrene, solvent: tetrahydrofuran), and the weight average molecular weight was 15000.

Then, 28 g of the polymer solution, 26 g of a copper phthalocyanine pigment, 13.6 g of 1 mol/L potassium hydroxide, 20 g of methyl ethyl ketone, and 30 g of ion exchange water were thoroughly mixed. Next, the mixture was kneaded 20 times by using a three-roll mill (trade name: NR-84A, manufactured by Noritake Co., Ltd.). The obtained paste was poured into 200 g of ion exchange water and then, the mixture was thoroughly mixed. Then, methyl ethyl ketone and water were distilled using an evaporator to obtain 160 g of a blue polymer microparticle dispersion having a solid content of 20.0%. The average particle diameter (D50%) of the polymer microparticles measured by a Microtrac UPA was 98 nm (Dispersion 2: Magenta Dispersion)

A reddish violet polymer microparticle dispersion was obtained in the same manner as in the case of preparing the cyan dispersion except that the copper phthalocyanine pigment used in the above cyan dispersion was altered to a C. I. Pigment Red 122. The average particle diameter (D50%) of the polymer microparticles measured by a Microtrac CPA was 124 nm.

(Dispersion 3: Yellow Dispersion)

An yellow polymer microparticle dispersion was obtained in the same manner as in the case of preparing the cyan dispersion except that the copper phthalocyanine pigment used in the above cyan dispersion was altered to a C. I. pigment Yellow 74. The average particle diameter (D50%) of the polymer microparticles measured by a Microtrac UPA was 78 nm.

(Dispersion 4: Black Dispersion)

A black polymer microparticle dispersion was obtained in the same manner as in the case of preparing the cyan dispersion except that the copper phthalocyanine pigment used in the above cyan dispersion was altered to carbon black (trade name: FW100, manufactured by Degussa AG). The average particle diameter (D50%) of the polymer microparticles measured by a Microtrac UPA was 110 nm.

<Ink Preparation Example of Ink>

Inks were produced in Preparation examples 1 to 14 and Preparation examples 1' to 26' by using materials in the formulations shown in Tables 1, 2-1 to 2-2 including the above dispersions 1 to 4. The unit of each value in the tables is "mass %".

The materials were blended in the order of a water-soluble organic solvent→surfactant→foam inhibitor/antifoaming agent→penetrating agent→antiseptic→ion exchange water and the mixture was stirred for 30 min. Then, each of the above dispersions 1 to 4 was added and the mixture was stirred for 30 min, followed by filtering the mixture by a membrane filter having a hole diameter of 0.8 μm to obtain ink.

TABLE 1

| | | INK PREPARATION EXAMPLES | | | | | | |
|---|---|---|---|---|---|---|---|---|
| | | 1 | 2 | 3 | 4 | 5 | 6 | 7 |
| DISPERSION 1 | C | 13.00 | | | | 21.00 | | |
| DISPERSION 2 | M | | 18.00 | | | | 30.00 | |
| DISPERSION 3 | Y | | | 20.00 | | | | 11.00 |
| DISPERSION 4 | K | | | | 28.00 | | | |
| SURFACTANT | SURFACTANT A | 0.04 | 0.04 | 0.03 | 0.03 | 0.03 | 0.03 | 0.06 |
| | SURFACTANT B | | | | | | | |
| | SURFACTANT C | | | | | | | |
| | SURFACTANT D | | | | | | | |
| WATER-SOLUBLE ORGANIC SOLVENT | GLYCERIN | 10.00 | 9.00 | 13.00 | 8.50 | 10.00 | 8.00 | 10.00 |
| | 3-METHYL-1,3-BUTANEDIOL | | | | | | | |
| | 1,3-BUTANEDIOL | | 33.00 | | 22.00 | | 26.00 | |
| | 1,6-HEXANEDIOL | 35.00 | | 30.00 | | 28.00 | | 35.00 |
| | 1,5-PENTANEDIOL | | | | | | | |
| | 2-PYRROLIDONE | | | | | | | |
| FOAM INHIBITOR | 2,4,7,9-TETRAMETHYLDECANE-4,7-DIOL | 0.20 | 0.20 | 0.15 | 0.15 | 0.15 | 0.15 | 0.30 |
| ANTIFOAMING AGENT | KM-72F | | | | | | | |
| PENETRATING AGENT | 2-ETHYL-1,3-HEXANEDIOL | 2.00 | 2.00 | 2.00 | 2.00 | 2.00 | 2.00 | 3.50 |
| ANTI-MOLD AGENT | PROXEL LV | 0.20 | 0.20 | 0.25 | 0.25 | 0.25 | 0.25 | 0.20 |
| ION EXCHANGE WATER | | BALANCE | BALANCE | BALANCE | BALANCE | BALANCE | BALANCE | BALANCE |
| TOTAL | | 100.00 | 100.00 | 100.00 | 100.00 | 100.00 | 100.00 | 100.00 |

| | | INK PREPARATION EXAMPLES | | | | | | |
|---|---|---|---|---|---|---|---|---|
| | | 8 | 9 | 10 | 11 | 12 | 13 | 14 |
| DISPERSION 1 | C | | 13.00 | | | | 20.00 | |
| DISPERSION 2 | M | | | 18.00 | | | | 15.00 |
| DISPERSION 3 | Y | | | | 18.00 | | | |
| DISPERSION 4 | K | 17.00 | | | | 25.00 | | |
| SURFACTANT | SURFACTANT A | 0.04 | | | | | | |
| | SURFACTANT B | | | | 2.00 | 2.00 | | |
| | SURFACTANT C | | 0.10 | 0.10 | | | | |
| | SURFACTANT D | | | | | | 1.30 | 1.50 |
| WATER-SOLUBLE ORGANIC SOLVENT | GLYCERIN | 8.00 | 10.00 | 9.00 | 22.00 | 20.00 | 14.00 | 12.00 |
| | 3-METHYL-1,3-BUTANEDIOL | 29.00 | | | | | | 14.00 |
| | 1,3-BUTANEDIOL | | | 33.00 | 15.00 | | 15.00 | |
| | 1,6-HEXANEDIOL | | 35.00 | | | | | |
| | 1,5-PENTANEDIOL | | | | | 20.00 | | |
| | 2-PYRROLIDONE | | | | | | | 1.00 |
| FOAM INHIBITOR | 2,4,7,9-TETRAMETHYLDECANE-4,7-DIOL | 0.20 | 0.20 | 0.20 | | | | |
| ANTIFOAMING AGENT | KM-72F | | | | 0.15 | 0.15 | 0.15 | 0.15 |
| PENETRATING AGENT | 2-ETHYL-1,3-HEXANEDIOL | 3.50 | 2.00 | 2.00 | 2.00 | 2.00 | 2.00 | 2.00 |
| ANTI-MOLD AGENT | PROXEL LV | 0.20 | 0.20 | 0.20 | 0.25 | 0.25 | 0.25 | 0.25 |
| ION EXCHANGE WATER | | BALANCE | BALANCE | BALANCE | BALANCE | BALANCE | BALANCE | BALANCE |
| TOTAL | | 100.00 | 100.00 | 100.00 | 100.00 | 100.00 | 100.00 | 100.00 |

TABLE 2-1

| | | INK PREPARATION EXAMPLES | | | | | | |
|---|---|---|---|---|---|---|---|---|
| | | 1' | 2' | 3' | 4' | 5' | 6' | 7' |
| DISPERSION 1 | C | 14.00 | | | | 22.00 | | |
| DISPERSION 2 | M | | 19.00 | | | | 33.00 | |
| DISPERSION 3 | Y | | | 14.00 | | | | 22.00 |
| DISPERSION 4 | K | | | | 19.00 | | | |

TABLE 2-1-continued

|  |  | | | | | | | |
|---|---|---|---|---|---|---|---|---|
| SURFACTANT | SURFACTANT A | 0.04 | 0.04 | 0.05 | 0.03 | 0.03 | 0.03 | 0.03 |
|  | SURFACTANT B | | | | | | | |
|  | SURFACTANT C | | | | | | | |
|  | SURFACTANT D | | | | | | | |
| WATER-SOLUBLE ORGANIC SOLVENT | GLYCERIN | 11.00 | 9.00 | 11.00 | 8.00 | 11.00 | 8.00 | 13.00 |
|  | 3-METHYL-1,3-BUTANEDIOL | | | | | | | |
|  | 1,3-BUTANEDIOL | | 32.00 | | 32.00 | | 26.50 | |
|  | 1,6-HEXANEDIOL | 35.00 | | 35.00 | | 28.50 | | 31.50 |
|  | 1,5-PENTANEDIOL | | | | | | | |
|  | 2-PYRROLIDONE | | | | | | | |
| FOAM INHIBITOR | 2,4,7,9-TETRAMETHYLDECANE-4,7-DIOL | 0.20 | 0.20 | 0.20 | 0.20 | 0.15 | 0.15 | 0.15 |
| ANTIFOAMING AGENT | KM-72F | | | | | | | |
| PENETRATING AGENT | 2-ETHYL-1,3-HEXANEDIOL | 2.00 | 2.00 | 2.00 | 2.00 | 2.00 | 2.00 | 2.00 |
| ANTI-MOLD AGENT | PROXEL LV | 0.25 | 0.25 | 0.25 | 0.25 | 0.25 | 0.25 | 0.25 |
| ION EXCHANGE WATER | | BALANCE | BALANCE | BALANCE | BALANCE | BALANCE | BALANCE | BALANCE |
| TOTAL | | 100.00 | 100.00 | 100.00 | 100.00 | 100.00 | 100.00 | 100.00 |

|  |  | INK PREPARATION EXAMPLES | | | | | |
|---|---|---|---|---|---|---|---|
|  |  | 8' | 9' | 10' | 11' | 12' | 13' |
| DISPERSION 1 | C | | 14.00 | | | | 14.00 |
| DISPERSION 2 | M | | | 19.00 | | | |
| DISPERSION 3 | Y | | | | 14.00 | | |
| DISPERSION 4 | K | 33.00 | | | | 19.00 | |
| SURFACTANT | SURFACTANT A | 0.02 | | | | | 0.04 |
|  | SURFACTANT B | | | | | | |
|  | SURFACTANT C | | 0.10 | 0.10 | 0.10 | 0.08 | |
|  | SURFACTANT D | | | | | | |
| WATER-SOLUBLE ORGANIC SOLVENT | GLYCERIN | 8.00 | 10.00 | 9.00 | 22.00 | 20.00 | 11.00 |
|  | 3-METHYL-1,3-BUTANEDIOL | | | | | | |
|  | 1,3-BUTANEDIOL | 23.50 | | 33.00 | 15.00 | | |
|  | 1,6-HEXANEDIOL | | 35.00 | | | | 33.00 |
|  | 1,5-PENTANEDIOL | | | | | 20.00 | |
|  | 2-PYRROLIDONE | | | | | | |
| FOAM INHIBITOR | 2,4,7,9-TETRAMETHYLDECANE-4,7-DIOL | 0.10 | 0.20 | 0.20 | 0.20 | 0.20 | 0.50 |
| ANTIFOAMING AGENT | KM-72F | | | | | | |
| PENETRATING AGENT | 2-ETHYL-1,3-HEXANEDIOL | 2.00 | 2.00 | 2.00 | 2.00 | 2.00 | 3.50 |
| ANTI-MOLD AGENT | PROXEL LV | 0.25 | 0.20 | 0.20 | 0.25 | 0.25 | 0.25 |
| ION EXCHANGE WATER | | BALANCE | BALANCE | BALANCE | BALANCE | BALANCE | BALANCE |
| TOTAL | | 100.00 | 100.00 | 100.00 | 100.00 | 100.00 | 100.00 |

TABLE 2-2

|  |  | INK PREPARATION EXAMPLES | | | | | | |
|---|---|---|---|---|---|---|---|---|
|  |  | 14' | 15' | 16' | 17' | 18' | 19' | 20' |
| DISPERSION 1 | C | | | | 22.00 | | | |
| DISPERSION 2 | M | 19.00 | | | | 15.00 | | |
| DISPERSION 3 | Y | | 14.00 | | | | 20.00 | |
| DISPERSION 4 | K | | | 19.00 | | | | 18.00 |
| SURFACTANT | SURFACTANT A | 0.04 | 0.05 | 0.03 | | | | |
|  | SURFACTANT B | | | | | | | |
|  | SURFACTANT C | | | | | | | |
|  | SURFACTANT D | | | | 1.50 | 1.50 | 1.50 | 1.50 |
| WATER-SOLUBLE ORGANIC SOLVENT | GLYCERIN | 9.00 | 11.00 | 8.00 | 8.00 | 7.50 | 8.00 | 7.50 |
|  | 3-METHYL-1,3-BUTANEDIOL | | | | | 14.00 | 14.00 | |
|  | 1,3-BUTANEDIOL | 30.00 | | 30.00 | 14.00 | | | |
|  | 1,6-HEXANEDIOL | | 33.00 | | | | | 14.00 |
|  | 1,5-PENTANEDIOL | | | | | | 5.00 | |
|  | 2-PYRROLIDONE | | | | | 1.00 | | 1.00 |

TABLE 2-2-continued

|  |  |  |  |  |  |  |  |  |
|---|---|---|---|---|---|---|---|---|
| FOAM INHIBITOR | 2,4,7,9-TETRAMETHYLDECANE-4,7-DIOL | 0.50 | 0.50 | 0.50 | 0.20 | 0.20 | 0.20 | 0.20 |
| ANTIFOAMING AGENT | KM-72F | | | | | | | |
| PENETRATING AGENT | 2-ETHYL-1,3-HEXANEDIOL | 3.50 | 3.50 | 3.50 | 2.00 | 2.00 | 2.00 | 2.00 |
| ANTI-MOLD AGENT | PROXEL LV | 0.25 | 0.25 | 0.25 | 0.25 | 0.25 | 0.25 | 0.25 |
| ION EXCHANGE WATER | | BALANCE | BALANCE | BALANCE | BALANCE | BALANCE | BALANCE | BALANCE |
| TOTAL | | 100.00 | 100.00 | 100.00 | 100.00 | 100.00 | 100.00 | 100.00 |

|  |  | INK PREPARATION EXAMPLES | | | | | |
|---|---|---|---|---|---|---|---|
|  |  | 21' | 22' | 23' | 24' | 25' | 26' |
| DISPERSION 1 | C | 12.00 | | | | | |
| DISPERSION 2 | M | | 15.00 | | | | |
| DISPERSION 3 | Y | | | 12.00 | | | |
| DISPERSION 4 | K | | | | 15.00 | 19.00 | 19.00 |
| SURFACTANT | SURFACTANT A | 0.04 | 0.04 | 0.05 | 0.03 | 0.06 | 0.01 |
|  | SURFACTANT B | 1.00 | 1.00 | 1.00 | 1.50 | | |
|  | SURFACTANT C | | | | | | |
|  | SURFACTANT D | | | | | | |
| WATER-SOLUBLE ORGANIC SOLVENT | GLYCERIN | 20.00 | 20.00 | 25.00 | 15.00 | 8.00 | 8.00 |
|  | 3-METHYL-1,3-BUTANEDIOL | | | | | | |
|  | 1,3-BUTANEDIOL | | 20.00 | | 15.00 | 30.00 | 35.00 |
|  | 1,6-HEXANEDIOL | 10.00 | | 15.00 | | | |
|  | 1,5-PENTANEDIOL | | | | | | |
|  | 2-PYRROLIDONE | | | | | | |
| FOAM INHIBITOR | 2,4,7,9-TETRAMETHYLDECANE-4,7-DIOL | | | | | 0.40 | 0.06 |
| ANTIFOAMING AGENT | KM-72F | 0.20 | 0.20 | 0.20 | 0.20 | | |
| PENETRATING AGENT | 2-ETHYL-1,3-HEXANEDIOL | 2.00 | 2.00 | 2.00 | 2.00 | 2.00 | 2.00 |
| ANTI-MOLD AGENT | PROXEL LV | 0.25 | 0.25 | 0.25 | 0.25 | 0.25 | 0.25 |
| ION EXCHANGE WATER | | BALANCE | BALANCE | BALANCE | BALANCE | BALANCE | BALANCE |
| TOTAL | | 100.00 | 100.00 | 100.00 | 100.00 | 100.00 | 100.00 |

The meanings of the marks and the details of the surfactants to be used in Tables 1, 2-1 and 2-2 are as follows.

KM-72F: Self-emulsion type silicone antifoaming agent (manufactured by Shin-Etsu Chemical Co., Ltd., component 100%).

Proxel LV: Manufactured by Nitto Denko Avecia Inc., anticeptic and anti-mold agent.

Surfactant A: Compound represented by the formula (I), in which n=4, a=21, and b=12.

Surfactant B: Compound having the following structure:

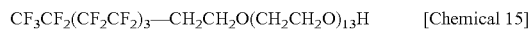

$CF_3CF_2(CF_2CF_2)_3$—$CH_2CH_2O(CH_2CH_2O)_{13}H$ [Chemical 15]

Surfactant C: BYK-348 (manufactured by BYK Japan KK, component 100%).

Surfactant D: ECTD-3NEX (manufactured by Nikko Chemicals Co., Ltd.)

The viscosity, dynamic surface tension, and static surface tension of each ink obtained in Preparation Examples 1 to 14 and Preparation Examples 1' to 26' were measured by the following methods. The results are shown in Tables 3 and 4.

Also, the case where the difference between the dynamic surface tension and static surface tension of each ink satisfies both the following requirements (1) and (2) was rated as "○" and other cases were rated as "x". The results are also shown.

(1) The dynamic surface tension is larger by 10 mN/m or more than the static surface tension when the surface life in a maximum foaming pressure method is 15 ms.

(2) The dynamic surface tension is larger by 5 mN/m or more than the static surface tension when the surface life in a maximum foaming pressure method is 1500 ms.

<Viscosity>

The viscosity (mPa·s) of each ink at 25° C. was measured using a R-type viscometer (trade name: RC-500, manufactured by Toki Sano Co., Ltd.) at a proper rotation speed of 10 to 100 rpm.

<Dynamic Surface Tension>

The dynamic surface tension (mN/m) at 25° C. was measured by a maximum foaming pressure method using a dynamic surface tensiometer SITA DynoTester (manufactured by SITA Messtechnik Company).

<Static Surface Tension>

The static surface tension (mN/m) at 25° C. was measured by a platinum plate method using a full automatic surface tensiometer (trade name: CBVP-Z, (manufactured by Kyowa Interface Science Co., Ltd.).

TABLE 3

| INK PREPARATION EXAMPLES | VISCOSITY (mPa·s) | DYNAMIC SURFACE TENSION (mN/m) | | | STATIC SURFACE TENSION (mN/m) | DIFFERENCE BETWEEN THE DYNAMIC SURFACE TENSION AND THE STATIC SURFACE TENSION |
|---|---|---|---|---|---|---|
| | | 15 ms | 150 ms | 1500 ms | | |
| 1 | 8.12 | 38.6 | 33.5 | 31.2 | 21.0 | ○ |
| 2 | 7.93 | 38.0 | 33.0 | 30.2 | 20.8 | ○ |
| 3 | 7.92 | 39.4 | 33.7 | 32.2 | 23.1 | ○ |
| 4 | 8.30 | 39.6 | 33.5 | 32.0 | 22.8 | ○ |
| 5 | 8.10 | 40.1 | 34.2 | 32.2 | 23.2 | ○ |
| 6 | 8.26 | 39.4 | 33.9 | 31.9 | 23.2 | ○ |
| 7 | 7.75 | 34.4 | 29.6 | 27.5 | 21.2 | ○ |
| 8 | 7.62 | 34.1 | 29.4 | 27.3 | 21.6 | ○ |
| 9 | 8.01 | 40.0 | 36.9 | 32.8 | 22.1 | ○ |
| 10 | 7.85 | 39.5 | 36.2 | 32.5 | 21.9 | ○ |
| 11 | 7.60 | 36.2 | 25.9 | 23.9 | 23.9 | X |
| 12 | 7.58 | 33.9 | 25.3 | 24.4 | 24.3 | X |
| 13 | 3.50 | 38.4 | 34.5 | 29.0 | 28.4 | X |
| 14 | 3.22 | 31.2 | 30.6 | 29.5 | 28.2 | X |

TABLE 4

| INK PREPARATION EXAMPLES | VISCOSITY (mPa·s) | DYNAMIC SURFACE TENSION (mN/m) | | | STATIC SURFACE TENSION (mN/m) | DIFFERENCE BETWEEN THE DYNAMIC SURFACE TENSION AND THE STATIC SURFACE TENSION |
|---|---|---|---|---|---|---|
| | | 15 ms | 150 ms | 1500 ms | | |
| 1' | 8.09 | 38.8 | 33.7 | 31.4 | 21.2 | ○ |
| 2' | 7.94 | 38.7 | 33.5 | 31.1 | 21.0 | ○ |
| 3' | 7.90 | 38.0 | 32.9 | 30.4 | 21.5 | ○ |
| 4' | 8.12 | 39.0 | 33.2 | 31.8 | 22.5 | ○ |
| 5' | 7.96 | 40.1 | 34.2 | 32.2 | 22.7 | ○ |
| 6' | 8.00 | 39.4 | 33.9 | 31.9 | 23.4 | ○ |
| 7' | 7.90 | 34.4 | 29.6 | 27.5 | 22.4 | ○ |
| 8' | 8.12 | 34.1 | 29.4 | 27.3 | 25.1 | ○ |
| 9' | 7.95 | 40.3 | 36.7 | 33.0 | 22.3 | ○ |
| 10' | 8.00 | 39.6 | 36.0 | 32.8 | 22.1 | ○ |
| 11' | 7.84 | 38.8 | 35.0 | 32.2 | 22.4 | ○ |
| 12' | 7.98 | 40.8 | 37.0 | 33.4 | 23.0 | ○ |
| 13' | 7.90 | 34.6 | 30.0 | 26.9 | 20.9 | ○ |
| 14' | 7.78 | 34.4 | 29.9 | 26.5 | 20.7 | ○ |
| 15' | 7.83 | 33.7 | 29.7 | 27.5 | 21.5 | ○ |
| 16' | 7.72 | 34.1 | 29.4 | 27.3 | 21.9 | ○ |
| 17' | 8.34 | 37.1 | 33.0 | 27.7 | 27.0 | X |
| 18' | 8.12 | 29.9 | 29.3 | 28.2 | 26.4 | X |
| 19' | 8.15 | 29.1 | 28.7 | 27.7 | 26.2 | X |
| 20' | 8.24 | 36.2 | 32.2 | 27.3 | 26.5 | X |
| 21' | 8.34 | 38.0 | 27.2 | 24.4 | 24.2 | X |
| 22' | 8.12 | 37.9 | 27.0 | 24.3 | 24.2 | X |
| 23' | 8.15 | 38.3 | 27.1 | 24.1 | 24.0 | X |
| 24' | 8.24 | 34.1 | 25.6 | 24.3 | 24.3 | X |
| 25' | 7.83 | 35.4 | 31.3 | 28.8 | 21.0 | ○ |
| 26' | 8.24 | 42.1 | 37.2 | 35.6 | 27.6 | ○ |

The inks obtained in the above preparation examples 1' to 26' were used to produce ink sets 1' to 8' having the combinations shown in table 5.

TABLE 5

| INK SET 1' | C | PREPARATION EXAMPLE 1' |
| | M | PREPARATION EXAMPLE 2' |
| | Y | PREPARATION EXAMPLE 3' |
| | K | PREPARATION EXAMPLE 4' |
| INK SET 2' | C | PREPARATION EXAMPLE 5' |
| | M | PREPARATION EXAMPLE 6' |
| | Y | PREPARATION EXAMPLE 7' |
| | K | PREPARATION EXAMPLE 8' |
| INK SET 3' | C | PREPARATION EXAMPLE 9' |
| | M | PREPARATION EXAMPLE 10' |
| | Y | PREPARATION EXAMPLE 11' |
| | K | PREPARATION EXAMPLE 12' |
| INK SET 4' | C | PREPARATION EXAMPLE 13' |
| | M | PREPARATION EXAMPLE 14' |
| | Y | PREPARATION EXAMPLE 15' |
| | K | PREPARATION EXAMPLE 16' |
| INK SET 5' | C | PREPARATION EXAMPLE 1' |
| | M | PREPARATION EXAMPLE 2' |
| | Y | PREPARATION EXAMPLE 3' |
| | K | PREPARATION EXAMPLE 25' |
| INK SET 6' | C | PREPARATION EXAMPLE 1' |
| | M | PREPARATION EXAMPLE 2' |
| | Y | PREPARATION EXAMPLE 3' |
| | K | PREPARATION EXAMPLE 26' |

TABLE 5-continued

| INK SET 7' | C | PREPARATION EXAMPLE 17' |
| | M | PREPARATION EXAMPLE 18' |
| | Y | PREPARATION EXAMPLE 19' |
| | K | PREPARATION EXAMPLE 20' |
| INK SET 8' | C | PREPARATION EXAMPLE 21' |
| | M | PREPARATION EXAMPLE 22' |
| | Y | PREPARATION EXAMPLE 23' |
| | K | PREPARATION EXAMPLE 24' |

Examples 1 to 10, Examples 1' to 4°, Comparative Examples 1 to 18, and Comparative Examples 1' to 12'

Each ink obtained in the above Examples 1 to 14, Preparation Examples 1' to 26', and ink set 1' to 8' was evaluated in the following manner. The results are shown in Tables 6 and 7.

Also, the case where the requirement (4) of claim 2 that the static surface tension of black ink at 25° C. is larger by 0 to 4 mN/m than that of each of all other color inks is satisfied is rated as "○" and the case where the requirement is not satisfied was rated as "x". The results are shown in Table 7

<Preparation Prior to Evaluation of a Printer>

Figure 8:
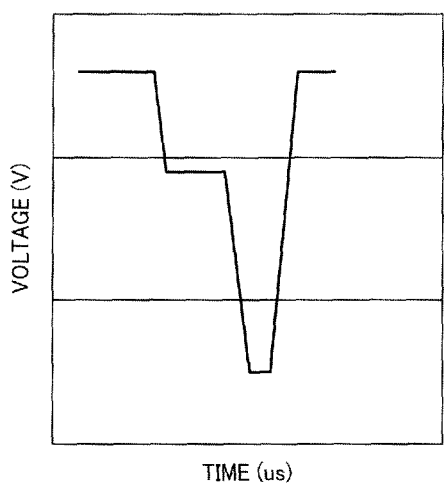
FIG. 8 is a view showing "waveform 1" used to evaluate ink.
Figure 9:
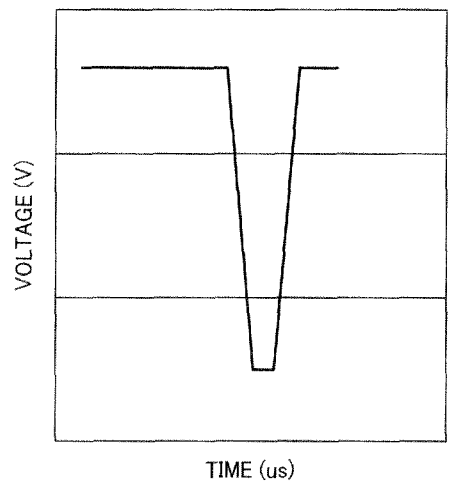
FIG. 9 is a view showing "waveform 2" used to evaluate ink.

An inkjet printer (trade name: 1PSio GXe3300, manufactured by Ricoh Company, Ltd.) equipped with an ink container (ink cartridge) was used in the environment controlled in the condition of a temperature of 25±0.5° C. and a humidity of 50±5% RH and a waveform for ejecting ink most stably was selected and used in all evaluations of printing. At this time, a discharge waveform having a pulse drawing a meniscus in two stages just before the ejection as shown in FIG. 8 is defined as "waveform 1" and a discharge waveform having a pulse drawing a meniscus in one stage just before the ejection as shown in FIG. 9 is defined as "waveform 2".

Examples 1 to 10 are each the case where the "waveform 1" was used for the inks 1 to 10.

Comparative Examples 1 to 4 are each the case where the "waveform 1" was used for the inks 11 to 14.

Comparative Examples 5 to 18 are each the case where the "waveform 2" was used for the inks 1 to 14.

Examples 1' to 4' are each the case where the "waveform 1" was used for the ink sets 1' to 4'.

Comparative Examples 1' to 4' are each the case where the "waveform 1" was used for the ink sets 5' to 8'.

Comparative Examples 5' to 12' are each the case where the "waveform 2" was used for the ink sets 1' to 8'.

<Evaluation of Discharge Stability>

The aforementioned printer was used to print on My Paper (manufactured by Ricoh Business Expert Co., Ltd.) by using the aforementioned each ink of yellow, magenta, cyan, and black. The print pattern was a chart whose print area of each ink was 5% of that of all paper area and was printed with 100% duty. In the printing condition of a recording density of 600 dpi and one-pass printing, print samples of "waveform 1" and "waveform 2" were made. At this time, intermittent printing operation was carried out. Specifically, the above chart was continuously printed on 20 paper sheets and then, the printer was put in a suspended condition where no discharge operation was performed for 20 min. This operation cycle was repeated 50 times to print a total of 1000 copies and then, the same chart was printed once more. Then, the condition as to whether or not there are printing defects of the 5% chart solid part such as streaks, white void, and discharge disturbance was visually observed to rate according to the following standard. "A" means "pass".

(Evaluation Standard)

A: Streaks, white void, and discharge disturbance are not observed in the solid part.

B: Slight streaks, white void, and discharge disturbance are observed in the solid part.

C: Streaks, white void, and discharge disturbance are observed in all range of the solid part.

<Uniformity of the Solid Print Part (Solid Part Uniformity)>

The aforementioned printer was used to print on a Ricoh business coat gross 100 (manufactured by Ricoh Co., Ltd.) by using the aforementioned each ink of yellow, magenta, cyan, and black. A solid image was printed with 100% duty. At this time, print samples of "waveform 1" and "waveform 2" were made.

The uniformity of the obtained solid image was visually observed to rate according to the following standard. "A" means "pass".

(Evaluation Standard)

A: Unevenness is hardly observed in the solid part.

B: Slight unevenness is observed in the solid part.

C: Unevenness is observed in all range of the solid part.

<Evaluation of Bleeding Between Black Ink and Other Color Inks>

This evaluation was made only for Examples 1' to 4' and Comparative Examples 1' to 4'.

The aforementioned printer was used to print on My Paper (manufactured by Ricoh Business Expert Co., Ltd.). The print pattern was printed using each color ink with 100% duty. The printing condition was as follows: a recording density of 600 dpi and one-pass printing. Print samples were made using only "waveform 1".

Black ink characters were printed in the obtained ink solid image of each color to visually evaluate the bleeding (blurring) between the color inks and black ink according to the following standard. "A" means "pass".

(Evaluation Standard)

A: No bleeding occurs, black characters can be clearly recognized, and no blurring is observed.

B: Slight bleeding occurs and black characters are blurred a little.

C: Bleeding occurs and it is difficult to recognize black characters.

TABLE 6

| | DIFFERENCE BETWEEN THE DYNAMIC SURFACE TENSION AND THE STATIC SURFACE TENSION | | WAVE-FORM | DIS-CHARGE STA-BILITY | SOLID PART UNI-FORMITY | | WAVE-FORM | DIS-CHARGE STA-BILITY | SOLID PART UNI-FORMITY |
|---|---|---|---|---|---|---|---|---|---|
| INK PREPARATION EXAMPLE 1 | ○ | EXAMPLE 1 | 1 | A | A | COMPARATIVE EXAMPLE 5 | 2 | C | B |
| INK PREPARATION EXAMPLE 2 | ○ | EXAMPLE 2 | 1 | A | A | COMPARNEIVE EXAMPLE 6 | 2 | C | B |

TABLE 6-continued

| | DIFFERENCE BETWEEN THE DYNAMIC SURFACE TENSION AND THE STATIC SURFACE TENSION | | WAVE-FORM | DIS-CHARGE STA-BILITY | SOLID PART UNI-FORMITY | | WAVE-FORM | DIS-CHARGE STA-BILITY | SOLID PART UNI-FORMITY |
|---|---|---|---|---|---|---|---|---|---|
| INK PREPARATION EXAMPLE 3 | ○ | EXAMPLE 3 | 1 | A | A | COMPARATIVE EXAMPLE 7 | 2 | C | B |
| INK PREPARATION EXAMPLE 4 | ○ | EXAMPLE 4 | 1 | A | A | COMPARATIVE EXAMPLE 8 | 2 | C | B |
| INK PREPARATION EXAMPLE 5 | ○ | EXAMPLE 5 | 1 | A | A | COMPARATIVE EXAMPLE 9 | 2 | C | B |
| INK PREPARATION EXAMPLE 6 | ○ | EXAMPLE 6 | 1 | A | A | COMPARATIVE EXAMPLE 10 | 2 | C | B |
| INK PREPARATION EXAMPLE 7 | ○ | EXAMPLE 7 | 1 | A | A | COMPARATIVE EXAMPLE 11 | 2 | C | B |
| INK PREPARATION EXAMPLE 8 | ○ | EXAMPLE 8 | 1 | A | A | COMPARATIVE EXAMPLE 12 | 2 | C | B |
| INK PREPARATION EXAMPLE 9 | ○ | EXAMPLE 9 | 1 | A | A | COMPARATIVE EXAMPLE 13 | 2 | C | B |
| INK PREPARATION EXAMPLE 10 | ○ | EXAMPLE 10 | 1 | A | A | COMPARATIVE EXAMPLE 14 | 2 | C | B |
| INK PREPARATION EXAMPLE 11 | X | COMPARATIVE EXAMPLE 1 | 1 | A | B | COMPARATIVE EXAMPLE 15 | 2 | B | B |
| INK PREPARATION EXAMPLE 12 | X | COMPARATIVE EXAMPLE 2 | 1 | A | B | COMPARATIVE EXAMPLE 16 | 2 | B | B |
| INK PREPARATION EXAMPLE 13 | X | COMPARATIVE EXAMPLE 3 | 1 | B | C | COMPARATIVE EXAMPLE 17 | 2 | C | C |
| INK PREPARATION EXAMPLE 14 | X | COMPARATIVE EXAMPLE 4 | 1 | B | C | COMPARATIVE EXAMPLE 18 | 2 | C | C |

(1) Evaluation of discharge stability: It is found from Examples 1 to 10 that good discharge stability is obtained by using a discharge waveform having a pulse drawing a meniscus in two stages if the values of surface tensions satisfy the necessary requirements.

(2) Evaluation of discharge stability: When comparing Examples 1 to 10 with Comparative Examples 5 to 14, it is found that good discharge stability is not obtained even by using ink having the characteristic that the values of surface tensions satisfy the necessary requirements if a discharge waveform having a pulse drawing a meniscus in two stages is not used.

(3) Evaluation of the uniformity of the solid part: When comparing Examples 1 to 10 with Comparative Examples 1 to 4, it is found that if the values of the surface tensions unsatisfy the necessary requirements even though the discharge stability is better, the uniformity of the solid part is deteriorated. This reason is that when the values of surface tensions satisfy the necessary requirements, stable liquid droplets are formed due to high dynamic surface tension just after the liquid droplets are ejected from the head and the penetration smoothly progresses due to low static surface tension and beading is hardly caused after the liquid droplets are landed on the surface of a paper sheet.

TABLE 7

| Ink Set | Color | Preparation Example | Difference between the dynamic surface tension and the static surface tension | Static surface tension difference between black ink and other color ink | Example | Discharge stability | Solid part uniformity | Bleeding between black ink and other color ink | Comparative Example | Discharge stability | Solid part uniformity |
|---|---|---|---|---|---|---|---|---|---|---|---|
| INK SET 1' | C | PREPARATION EXAMPLE 1' | ○ | ○ | EXAMPLE 1' | A | A | A | COMPARATIVE EXAMPLE 3' | C | B |
| | M | PREPARATION EXAMPLE 2' | ○ | | | A | A | A | | C | B |
| | Y | PREPARATION EXAMPLE 3' | ○ | | | A | A | A | | C | B |
| | K | PREPARATION EXAMPLE 4' | ○ | | | A | A | A | | C | B |
| INK SET 2' | C | PREPARATION EXAMPLE 5' | ○ | ○ | EXAMPLE 2' | A | A | A | COMPARATIVE EXAMPLE 4' | C | B |
| | M | PREPARATION EXAMPLE 6' | ○ | | | A | A | A | | C | B |
| | Y | PREPARATION EXAMPLE 7' | ○ | | | A | A | A | | C | B |
| | K | PREPARATION EXAMPLE 8' | ○ | | | A | A | A | | C | B |
| INK SET 3' | C | PREPARATION EXAMPLE 9' | ○ | ○ | EXAMPLE 3' | A | A | A | COMPARATIVE EXAMPLE 5' | C | B |
| | M | PREPARATION EXAMPLE 10' | ○ | | | A | A | A | | C | B |
| | Y | PREPARATION EXAMPLE 11' | ○ | | | A | A | A | | C | B |
| | K | PREPARATION EXAMPLE 12' | ○ | | | A | A | A | | C | B |
| INK SET 4' | C | PREPARATION EXAMPLE 13' | ○ | ○ | EXAMPLE 4' | A | A | A | COMPARATIVE EXAMPLE 6' | C | B |
| | M | PREPARATION EXAMPLE 14' | ○ | | | A | A | A | | C | B |
| | Y | PREPARATION EXAMPLE 15' | ○ | | | A | A | A | | C | B |
| | K | PREPARATION EXAMPLE 16' | ○ | | | A | A | A | | C | B |
| INK SET 5' | C | PREPARATION EXAMPLE 1' | ○ | X | EXAMPLE 5' | A | A | B | COMPARATIVE EXAMPLE 7' | C | B |
| | M | PREPARATION EXAMPLE 2' | ○ | | | A | A | B | | C | B |
| | Y | PREPARATION EXAMPLE 3' | ○ | | | A | A | B | | C | B |
| | K | PREPARATION EXAMPLE 25' | ○ | | | A | A | B | | C | B |
| INK SET 6' | C | PREPARATION EXAMPLE 1' | ○ | X | EXAMPLE 6' | A | A | B | COMPARATIVE EXAMPLE 8' | C | B |
| | M | PREPARATION EXAMPLE 2' | ○ | | | A | A | B | | C | B |

TABLE 7-continued

| | | Difference between the dynamic surface tension and the static surface tension | Static surface tension difference between black ink and other color ink | Discharge stability | Solid part uniformity | Bleeding between black ink and other color ink | Discharge stability | Solid part uniformity |
|---|---|---|---|---|---|---|---|---|
| | Y Preparation Example 3' | ○ | | A | A | B | C | B |
| | K Preparation Example 26' | ○ | | A | A | B | C | B |
| Ink Set 7' | C Preparation Example 17' | X | X (Comparative Example 1') | B | C | C | C | C |
| | M Preparation Example 18' | X | | B | C | C | C | C |
| | Y Preparation Example 19' | X | | B | C | C | C | C |
| | K Preparation Example 20' | X | | B | C | C (Comparative Example 9') | C | C |
| Ink Set 8' | C Preparation Example 21' | X | ○ (Comparative Example 2') | A | B | A | B | B |
| | M Preparation Example 22' | X | | A | B | A | B | B |
| | Y Preparation Example 23' | X | | A | B | A (Comparative Example 10') | B | B |
| | K Preparation Example 24' | X | | A | B | A | B | B |

(1) Evaluation of discharge stability: It is found from Examples 1' to 4' that good discharge stability is obtained by using a discharge waveform having a pulse drawing a meniscus in two stages if the difference between the dynamic surface tension and the static surface tension satisfies the necessary requirements.

(2) Evaluation of discharge stability: When comparing Examples 1' to 4' with Comparative Examples 3' to 6', it is found that good discharge stability is obtained for the first time by using a discharge waveform having a pulse drawing a meniscus in two stages for ink having the characteristics that the values of the surface tensions satisfy the necessary requirements.

(3) Evaluation of discharge stability: When comparing Examples 1' to 4' with Comparative Example 1', it is found that ink which does not satisfy the necessary requirements is not so improved in discharge stability even if a discharge waveform having a pulse drawing a meniscus in two stages is used.

(4) Evaluation of the uniformity of the solid part: When comparing Examples 1' to 4' with Comparative Examples 3' to 6', it is found that good uniformity of the solid part is obtained by using a discharge waveform having a pulse drawing a meniscus in two stages.

(5) Evaluation of the uniformity of the solid part: When comparing Examples 1' to 4' with Comparative Example 2', it is found that if the values of the surface tensions unsatisfy the necessary requirements even though the discharge stability is better, the uniformity of the solid part is deteriorated.

This reason is that when the values of surface tensions satisfy the necessary requirements, stable liquid droplets are formed due to high dynamic surface tension just after the liquid droplets are ejected from the head and the penetration smoothly progresses due to low static surface tension and beading is hardly caused after the liquid droplets are landed on the surface of a paper sheet.

(6) Evaluation of bleeding between black ink and color ink: When comparing Examples 1' to 4' with Examples 5' and 6' and with Comparative Example 1', no bleeding is caused, so that a good image is obtained if the values of the static surface tension satisfy the necessary requirements.

What is claimed is:

1. An inkjet recording method performed using an inkjet recording device including a recording head provided with a nozzle ejecting liquid droplets of aqueous ink, a pressure chamber communicated with the nozzle, and a pressure generator that pressurizes the pressure chamber, and a driving signal generator that generates signals applied to the pressure generator, the method comprising ejecting the aqueous ink droplets by the pressure generated by the pressure generator according to the signals and satisfying the following requirements (1) and (2):
   (1) it is required to use aqueous ink having a dynamic surface tension larger by 10 mN/m or more than a static surface tension when the surface life measured at 25° C. by a maximum foaming pressure method is 15 ins and a dynamic surface tension larger by 5 mN/m or more than a static surface tension when the surface life measured by a maximum foaming pressure method is 1500 ms; and
   (2) it is required that the signals have a drawing pulse in one print period and the aqueous ink forming a meniscus in the nozzle is drawn into the nozzle in two stages by the drawing pulse.

2. The inkjet recording method according to claim 1, wherein the drawing pulse in the signals in the one print period exists preceding the discharge pulse for ejecting aqueous ink.

3. The inkjet recording method according to claim 1, the method further satisfying the following requirements (3) and (4):
   (3) it is required to use an ink set including aqueous inks having two or more colors including black; and
   (4) it is required that the static surface tension of the black ink at 25° C. is higher by 0 to 4 mN/m than those of all other color inks.

4. The inkjet recording method according to claim 3, wherein the viscosity of each ink of the ink set at 25° C. is 3 to 20 mPa·s.

5. The inkjet recording method according to claim 1, wherein the surface of the nozzle is treated to provide water repellency.

6. The inkjet recording method according to claim 1, wherein the ink contains water, a water-soluble organic solvent, a colorant, and a surfactant.

7. A recorded material comprising an image formed by the ink jet recording method according to claim 1 on a recording medium.

8. An ink jet recording device comprising a recording head provided with a nozzle ejecting liquid droplets of aqueous ink, a pressure chamber communicated with the nozzle, and a pressure generator that pressurizes the pressure chamber, and a driving signal generator that generates signals applied to the pressure generator to eject the aqueous ink droplets by the pressure generated by the pressure generator according to the signals, and the device satisfying the following requirements (1) and (2):
   (1) it is required that the device is provided with a container that stores aqueous ink having a dynamic surface tension larger by 10 mN/m or more than a static surface tension when the surface life measured at 25° C. by a maximum foaming pressure method is 15 ms and a dynamic surface tension larger by 5 mN/m or more than a static surface tension when the surface life measured at 25° C. by a maximum foaming pressure method is 1500 ms; and
   (2) it is required that the signals have a drawing pulse drawing a meniscus of the aqueous ink into the nozzle in two stages in one print period.

9. The inkjet recording device according to claim 8, wherein the drawing pulse in the signals in the one print period exists preceding the discharge pulse for ejecting aqueous ink.

10. The inkjet recording device according to claim 8, the method further satisfying the following requirements (3) and (4):
   (3) it is required to use an ink set including aqueous inks having two or more colors including black; and
   (4) it is required that the static surface tension of the black ink at 25° C. is higher by 0 to 4 mN/m than those of all other color inks.

* * * * *